US007123988B2

(12) United States Patent  
Russell et al.

(10) Patent No.: US 7,123,988 B2
(45) Date of Patent: Oct. 17, 2006

(54) SYSTEM AND APPARATUS FOR MATERIALS TRANSPORT AND STORAGE

(76) Inventors: Paul Robert Russell, 7673 Laurelwood Dr., Canal Winchester, OH (US) 43110; Toby L. Baumgartner, 2322 Majestic Ct., Columbus, OH (US) 43232

( * ) Notice: Subject to any disclaimer, the term of this patent is extended or adjusted under 35 U.S.C. 154(b) by 0 days.

(21) Appl. No.: 10/269,099

(22) Filed: Oct. 10, 2002

(65) Prior Publication Data

US 2003/0093178 A1 May 15, 2003

Related U.S. Application Data

(60) Provisional application No. 60/328,230, filed on Oct. 10, 2001.

(51) Int. Cl.
*G06F 7/00* (2006.01)
(52) U.S. Cl. .................. 700/217; 198/465.1; 414/239
(58) Field of Classification Search ................ 700/217, 700/218, 219; 414/239; 198/465.1, 795
See application file for complete search history.

(56) References Cited

U.S. PATENT DOCUMENTS

| 2,784,852 | A |   | 3/1957  | Strauss et al. |
|-----------|---|---|---------|----------------|
| 3,080,204 | A |   | 3/1963  | Lindhgren |
| 3,135,399 | A |   | 6/1964  | De Saint-Andre |
| 3,213,993 | A |   | 10/1965 | Long |
| 3,647,014 | A | * | 3/1972  | Wilke et al. ............... 180/14.1 |
| 3,757,931 | A |   | 9/1973  | Baker et al. |
| 3,822,792 | A | * | 7/1974  | Weingarten ................. 414/676 |
| 3,860,130 | A |   | 1/1975  | Frangos |
| 4,017,131 | A |   | 4/1977  | Camenisch |
| 4,337,013 | A |   | 6/1982  | Buttironi |
| 4,470,742 | A |   | 9/1984  | Schindler |
| 4,698,775 | A |   | 10/1987 | Koch et al. |
| 4,735,305 | A |   | 4/1988  | Lutz et al. |
| 4,768,914 | A |   | 9/1988  | Sing |
| 4,772,176 | A |   | 9/1988  | Montgomery |
| 4,815,926 | A |   | 3/1989  | Chaffee et al. |
| 5,165,842 | A |   | 11/1992 | Hammer |
| 5,176,484 | A |   | 1/1993  | Kuperman et al. |
| 5,190,427 | A |   | 3/1993  | Lai |
| 5,314,285 | A |   | 5/1994  | Lai |
| 5,556,246 | A |   | 9/1996  | Broshi |
| 5,707,199 | A |   | 1/1998  | Faller |
| 5,857,413 | A |   | 1/1999  | Ward |
| 5,933,354 | A |   | 8/1999  | Shimada et al. |
| 5,967,727 | A |   | 10/1999 | Ritsch et al. |
| 6,026,378 | A |   | 2/2000  | Onozaki |
| 6,125,306 | A |   | 9/2000  | Shimada et al. |
| 6,148,291 | A |   | 11/2000 | Radican |

(Continued)

FOREIGN PATENT DOCUMENTS

EP 0 394 378 B1 5/1994

(Continued)

*Primary Examiner*—Khoi H. Tran
(74) *Attorney, Agent, or Firm*—W. Joseph Melnik; Pepper Hamilton LLP

(57) ABSTRACT

A system for moving a pallet is provided. The system provides for a pair of pallets each having means for inducing movement in relation to an other pallet. Further, logic is provided for calculating a movement instruction to move the pallets relative to each other. Additionally, the present invention provides for means for communicating the movement instruction to the movement means on the pallets to prompt movement of one of said pair of pallets relative to the other pallet. As no special floor surface or configuration is necessary, the present invention described herein may be readily adaptable for utilization within existing storage and inventory facilities.

15 Claims, 17 Drawing Sheets

U.S. PATENT DOCUMENTS 6,842,665 B1 * 1/2005 Karlen .................. 700/217

FOREIGN PATENT DOCUMENTS

| EP | 0 483 379 B1 | 9/1996 |
| EP | 0 671 348 B1 | 7/1999 |
| JP | 2002-154609 A2 | 5/2002 |
| WO | WO 01/40082 A1 | 6/2001 |
| WO | WO 02/20376 A1 | 3/2002 |

* cited by examiner

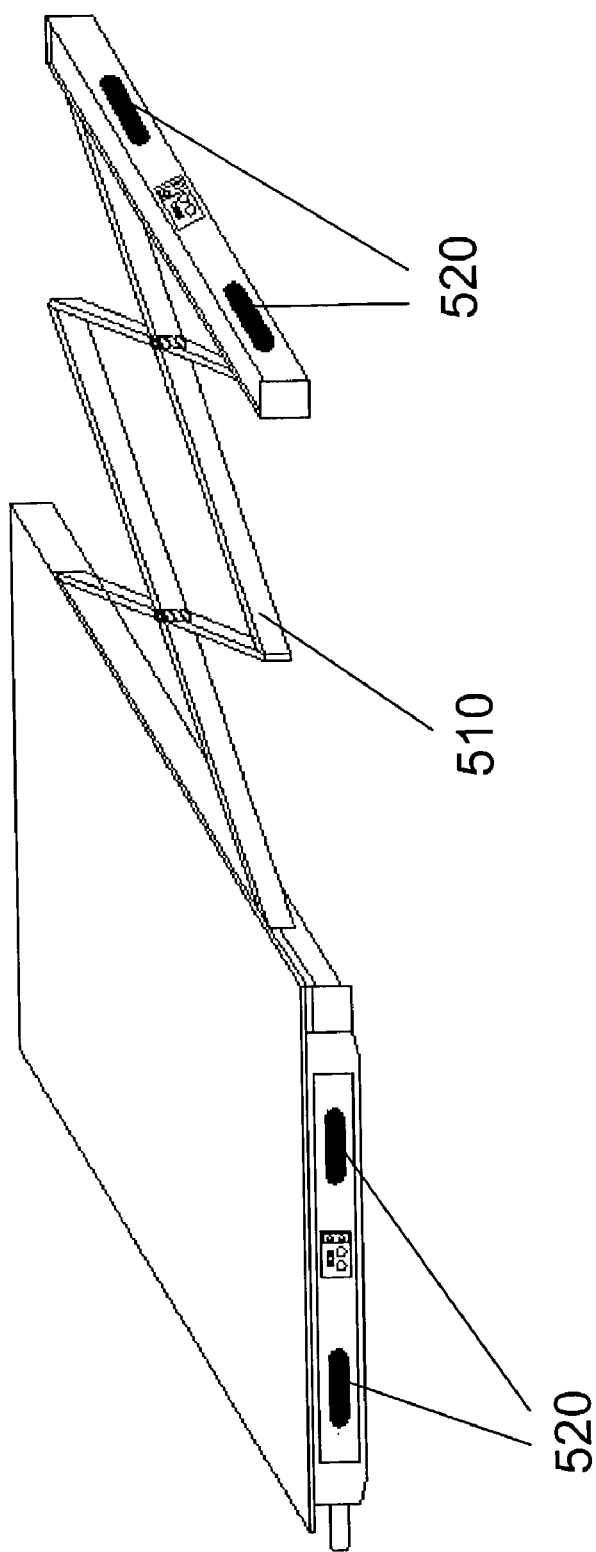

SYSTEM AND APPARATUS FOR MATERIALS TRANSPORT AND STORAGE

CROSS-REFERENCE TO RELATED APPLICATION

This application claims the benefit of U.S. Provisional Application No. 60/328,230 filed on Oct. 10, 2001 titled APPARATUS AND METHOD FOR MATERIALS TRANSPORT AND STORAGE OPTIMIZATION which is incorporated herein in its entirety by reference hereto.

FIELD OF THE INVENTION

The present invention relates to a system for the automated storing, retrieving, and transporting of goods of any shape, size, and configuration utilized in warehouses, ships, airplanes, trains, trucks or other apparatus for storing or transporting goods.

Generally, it finds application as a system and apparatus related to storage systems and more particularly is directed towards a high-density, modular storage and retrieval system employing a plurality of movable storage units. The present invention also provides for erecting aisle-less warehouses, aisle-less parking buildings, aisle-less parking lots and aisle-less storage areas maximizing utilization of available storage space, minimizing human touches and increasing product throughput.

Although, the invention finds particular application, but not exclusive, to automated storage, retrieval, and transportation of goods stacked on pallets in a matrix or grid format, it is appreciated that other containers and configurations may be utilized without departing from the spirit and scope of the invention.

BACKGROUND OF THE INVENTION

Traditionally, the storage and transportation of various materials in an inventory warehouse utilized the conventional wooden pallet. These conventional wooden pallets are usually transported by the use of either a hand truck or a conventional forklift. In either case, an operator moves the fork beneath the pallet, lifts the pallet and then physically moves the pallet to the desired location.

Conventional wooden pallets have many disadvantages. For instance, wooden pallets are subject to breakage, exposing sharp wooden edges, corners and nails, which can cause damage to both materials and to persons.

Additionally, the conventional pallets themselves are relatively heavy and cumbersome to maneuver even when utilizing the hand truck or forklift. Because of their weight and bulk, pallets are difficult for an individual person to carry from point to point. Pallets must frequently be moved from flatbed trucks onto loading docks, and vice versa. Therefore, when utilizing the conventional pallet, a hand truck or forklift must be present at every location.

In an effort to address some of the disadvantages previously described, pallets have been designed to incorporate an air bearing, film or cushion between the bottom of the pallet and the floor supporting the pallet. This design feature greatly eliminates friction between the pallet and the underlying floor enabling the pallet, along with its load, to be moved along the floor or other ground surface with relative ease.

In known warehouses, pallets and their loads are arranged side by side on one or more levels. The displacement of loaded pallets requires bulky, slow-acting and expensive transporting and lifting equipment that requires relatively broad access passageways to access the pallets. These access passageways involve a considerable loss of useful space in the warehouse. Furthermore, labor and maintenance are added costs that can be high utilizing traditional storage techniques.

The current invention provides a system and apparatus that is modular in design and able to automatically store, handle, retrieve and deliver bulk material inventory. The invention provides for aisle-less warehouses with the ability to automatically deliver palletized or other packaged goods and containers from the cargo bed of trucks, trains, planes, ships and the like directly onto the smooth floor of a warehouse. Additionally the invention can be used to move objects to any designated point in or out of the facility without manual human intervention.

SUMMARY OF THE INVENTION

According to one embodiment of the present invention, a system for moving a pallet is provided. The system includes a pair of pallets each having means for inducing movement in relation to the other pallet. Additionally, the system utilizes a control engine having logic to calculate a movement instruction to move one of the pair of pallets. Finally, means for communicating the movement instruction to the movement means on one of the pair of pallets to prompt movement of one of the pair of pallets is provided.

In accordance with another embodiment of the present invention, the logic is responsive to an electronic request.

Another embodiment includes a database for storing coordinate locational data relative to the pair of pallets. The database is capable of communicating with the control engine to retrieve the data.

In accordance with yet another embodiment of the invention, the system may utilize a low friction movement means to reduce force required to move the pair of pallets. Such low friction movement means may be an air cushion or the like.

Still further, another embodiment of the present invention provides for a moveable pallet including a pallet and an arm assembly connected to the pallet that is capable of engaging an other pallet for inducing relative movement between the pallet and the other pallet. The arm assembly in one embodiment may be a scissor-type arm assembly. Further, the arm assembly in another embodiment may be a telescopic-type arm assembly.

Additionally, in another embodiment of the invention, the pallet may include a transmitter for sending locational data or a receiver for receiving a movement instruction from a control engine.

Additionally, another embodiment provides for a pallet including a surface for supporting a load, at least one arm assembly means disposed beneath the surface and means for actuating the arm assembly to induce relative movement between the pallet and an other pallet. The actuating means may be an electric motor.

Still another embodiment of the present invention provides for at least one latching mechanism disposed on the pallet.

Yet another embodiment of the present invention provides for a system for moving a pallet including a controller capable of identifying available and unavailable locations in a grid and of creating a corresponding grid table. Additionally, the controller is capable of identifying pallet occupied and unoccupied locations in the grid and creating a corresponding pallet table. An alternative embodiment further includes logic for comparing the grid table to the pallet table and determining a movement instruction corresponding to an electronic request. Further, an alternative embodiment provides means for communicating the instruction to the pallet to induce movement of the pallet relative to an other pallet.

Yet another embodiment of the present invention provides for a method for moving a pallet by identifying available and unavailable locations in a grid, creating a grid table representative of grid coordinate data relative to the available and unavailable locations in the grid, identifying pallet occupied and unoccupied locations in the grid, creating a pallet table representative of pallet coordinate data relative to the occupied and unoccupied locations in the grid, comparing the grid table to the pallet table, determining a movement instruction, communicating the movement instruction to the pallet to induce movement relative to an other pallet, actuating an arm assembly on the pallet to engage an other pallet and inducing relative movement between the pallet and the other pallet.

BRIEF DESCRIPTION OF THE DRAWINGS

The invention may take form in various components and arrangements of components. The drawings are only for the purposes of illustrating the preferred embodiments and are not to be construed as limiting the invention.

FIG. 5 illustrates a perspective view of a pallet and extended scissor arm assembly that suitably practices an embodiment of the invention.

DETAILED DESCRIPTION OF THE ILLUSTRATED EMBODIMENTS

The following includes definitions of exemplary terms used throughout the disclosure. Both singular and plural forms of all terms fall within each meaning:

"Software", as used herein, includes but is not limited to one or more computer executable instructions, routines, algorithms, modules or programs including separate applications or ones from dynamically linked libraries for performing functions as described herein. Software may also be implemented in various forms such as a servlet, an applet, a stand-alone program including a server based application and a user based application, a plug-in or other type of application. Software may also be stored on various readable mediums such as disk, CD, tape, memory and can be downloadable.

"Database", as used herein, includes but is not limited to any means or methods used to organize, store and retrieve data such as relational database management systems (RDBMS), flat file structures, arrays, Random Access Memory (RAM), or the like.

"Logic", as used herein, includes but is not limited to hardware, 'software and/or combinations of both to perform one or more functions.

"Request", as used herein, refers to any identified or scheduled need to move a pallet, whether that need is the result of a manual operator action or the result of intelligent communications or coordination with disparate processing systems such as warehouse management systems (WMS), inventory management systems, order processing systems, or the like.

"Network", as used herein, includes but is not limited to the internet, intranets, Wide Area Networks (WANs), Local Area Networks (LANs), and transducer links such as those using Modulator-Demodulators (modems).

"Internet", as used herein, includes a wide area communications network, typically accessible by any user having appropriate software.

"Intranet", as used herein, includes a data communications network similar to an internet but, typically having access restricted to a specific group of individuals, organizations, or computers.

Figure 1:
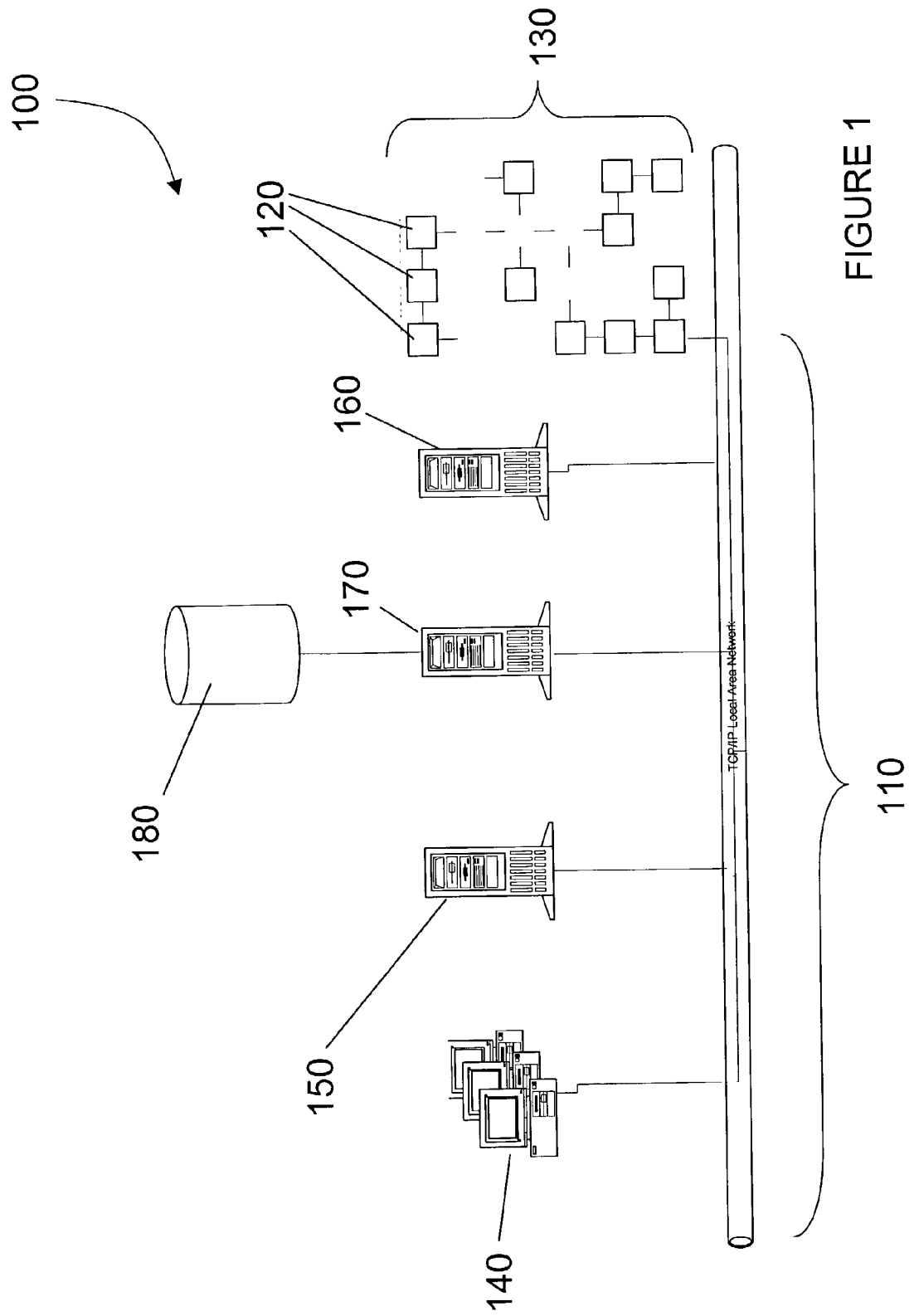
FIG. 1 illustrates an exemplary overall system diagram that suitably practices an embodiment of the invention.

FIG. 1 is an exemplary system diagram of the system 100 architecture in accordance with the present invention. As shown, the system 100 is configured with both hardware and software 110. In one embodiment, the system 100 is contained within an intranet network such as a TCP/IP local area network.

The preferred embodiment of the present invention operates under the control of a collection of computer hardware and software applications 110 that monitor, direct and coordinate the movements of automated self-propelled computer controlled pallets 120 arranged in a matrix or grid 130. The pallets 120 when arranged in a plurality or grid 130 on any smooth flat surface in a checkerboard-type fashion create a dynamic floor of shifting squares, each capable of being delivered to any other location in the configuration.

A variety of graphical user nodes, interfaces (GUI's) or operator desktops 140 in connection with a system manager server 150 provide operators, support and maintenance personnel with the tools needed to initiate, monitor and intervene with the system 100 in a real-time mode. Additionally, comprehensive inventory management software (not shown) interfaces with a system control server 160 to provide a high level of inventory tracking and delivery automation. The system control server 160 communicates with the individual pallets 120 in the grid 130 by providing instructions to effectuate the repositioning of the pallets 120 in accordance with a request. Additionally, a database server 170 and database 180 are provided to store the data pertinent to tracking and moving individual pallets 120 within the grid 130. The database server 170 preferably utilizes a RDBMS 180 and is one ordinarily known in the art, for example, Oracle, Microsoft SQL Server, Informix or the like.

Each of the system components will be more readily understood through a review of the drawings as described below.

Continued reference to FIG. 1 and briefly describing the operation of the system 100, a request for a specific load is entered by an operator via an operator node 140, or more commonly is scheduled automatically as a result of tight integration with disparate processing systems as mentioned in the definitions above under "request". The system control server 160 processes the request and communicates with the database server 170 to identify the appropriate pallet 120 and further the X-Y coordinate location of the requested pallet 120 within the grid 130. The system control server 160 then calculates the movement instructions necessary to fulfill the request. The system control server 160 then communicates the movement instructions necessary to fulfill the request to the pallets 120 within the grid 130. Each of the pallets 120 in the grid 130 are capable of receiving the movement instructions from the system control server 160 and of self-repositioning in accordance with the instructions. Finally, the system control server 160 receives updated location and product information from each pallet 120 and communicates with the database server 170 which updates the appropriate data in the database 180 necessary to respond to further requests.

It is contemplated that FIG. 1 represents a single embodiment of a network hardware configuration, and that each component reflects virtual components that may constitute clusters of servers in some configurations. One ordinarily skilled in the art can appreciate the available alternative designs available to perform any of the functions of the system 100. Furthermore, it is contemplated that the system 100 may be configured using servers that run a variety of operating systems including but, not limited to, Microsoft Windows™, Unix, Linux and the like.

The pallets 120 are configured in a grid 130 pattern as shown in FIG. 1 and are employed in a network in the same manner as computers are connected to the Internet. As stated earlier, this network of automated pallets 120 receives commands from the system control server 160. These signals are routed through the grid 130 of automated pallets 120 until they reach the target pallet 120. The target pallet 120 receiving the instruction then executes the command and returns an appropriate response signal (i.e. "Acknowledged", "Move Complete", "Errors Encountered", etc.) to the system controller server 160 which updates the database 180.

Figure 2:
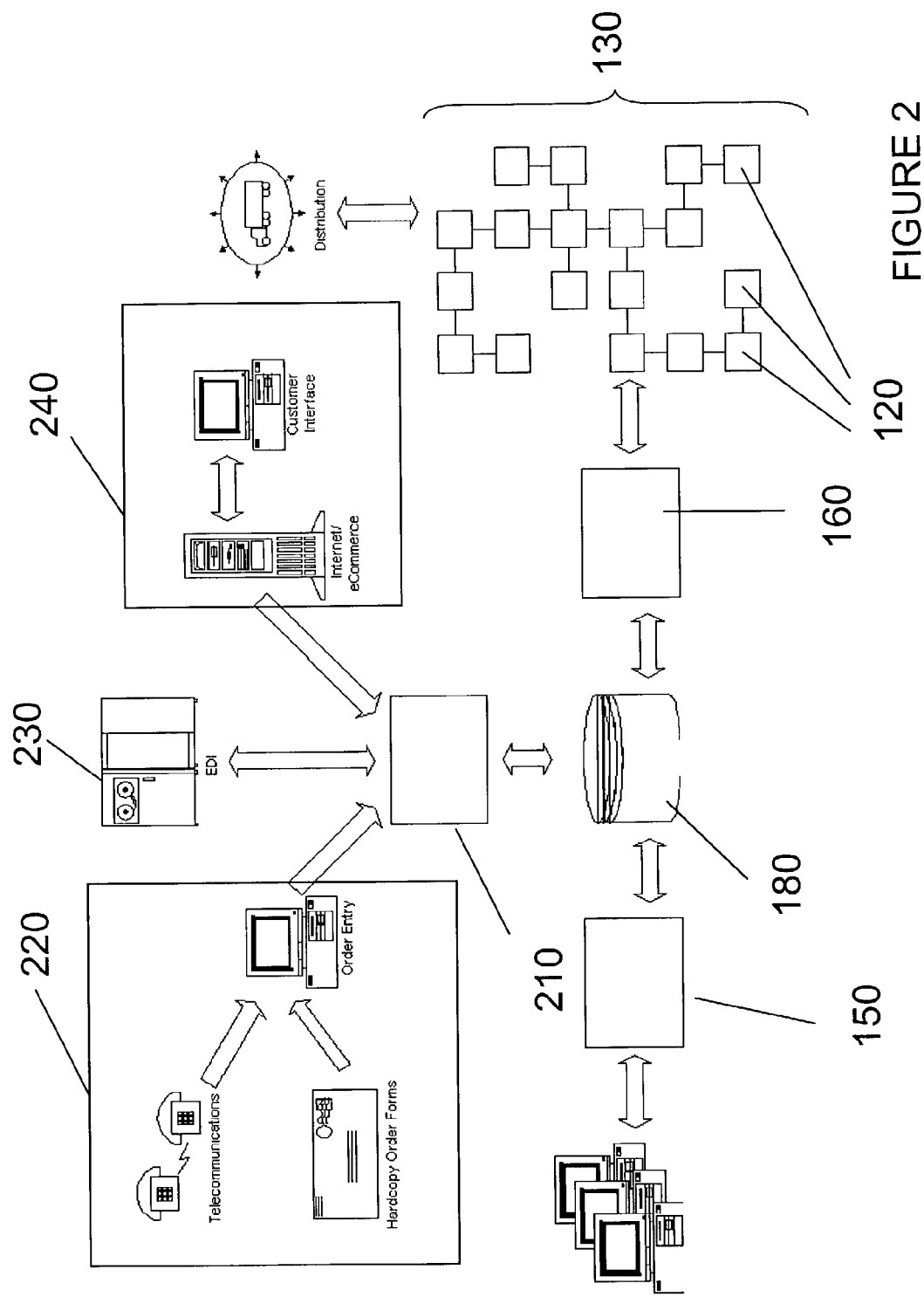
FIG. 2 illustrates an exemplary system flow diagram that suitably practices an embodiment of the invention.

As illustrated in FIG. 2, a common database 180 is a central component shared by the three sub-systems; a system control server 160, a system manager server 150 and the inventory manager 210. Information placed or updated in the database 180 by one sub-system triggers events and drives activity in another.

In operation, orders for goods/materials are entered into the inventory manager 210 through a variety of methods, including, but not limited to, manual entry 220, electronic data interchange (EDI) 230, or other e-commerce channels such as customer entry via the internet 240. Requests entered into the database 180 are processed by the system control server 160, which identifies the location of a target pallet 120 containing the ordered goods.

Based on the current location of the target pallet 120 and state of the grid 130, the system control server 160 calculates movement instructions pursuant to the coordinates and subsequently communicates with the pallets 120 in the grid 130 to deliver the designated pallet 120 to the desired location. The actions of the system control server 160 effectively moving pallets 120 around the grid 130 are monitored by the system manager server 150, which continually updates the operator node 140 to reflect the current and ever shifting state of the grid 130.

Figure 7:
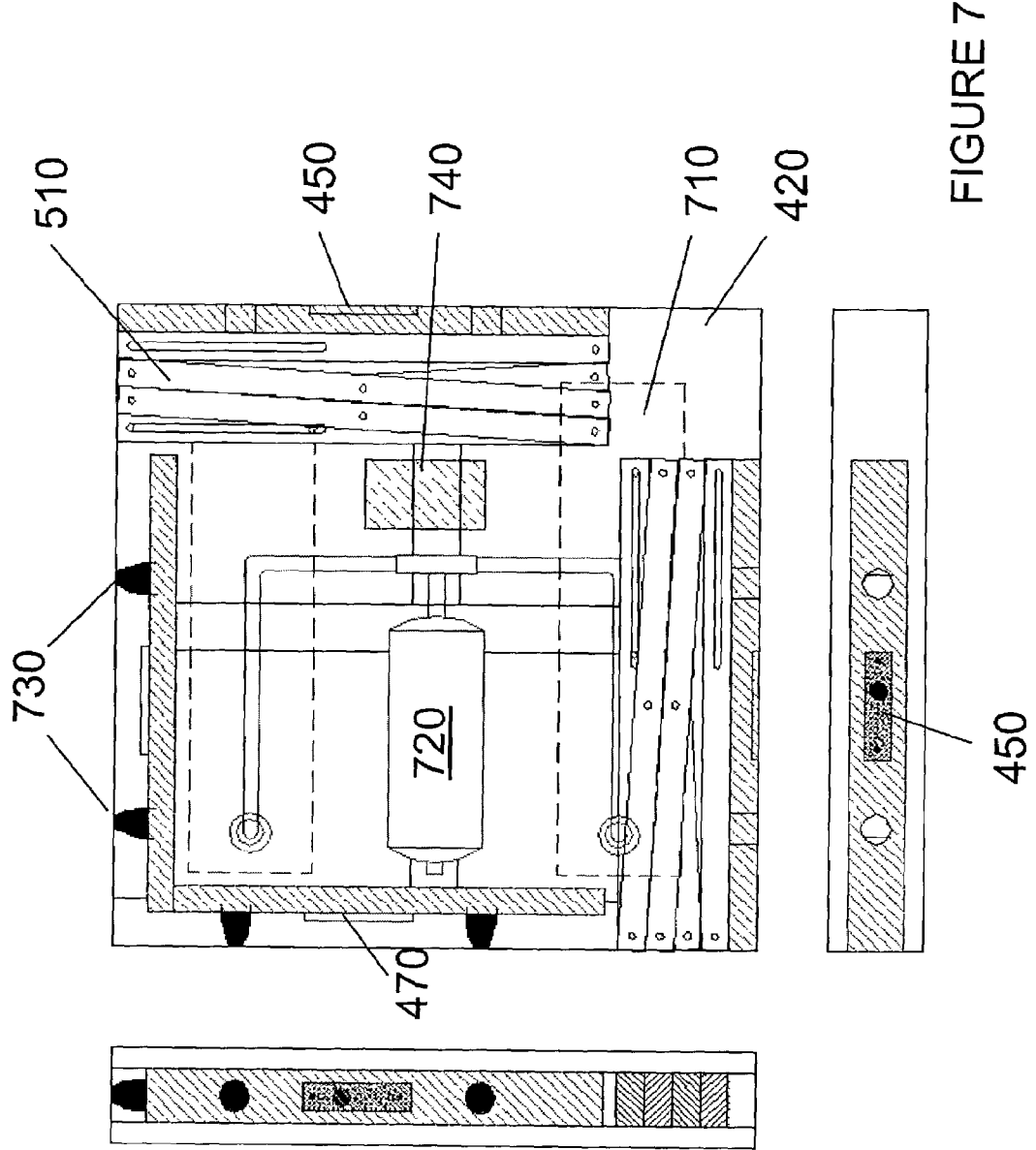
FIG. 7 illustrates a cross-sectional view of a pallet that suitably practices an embodiment of the invention.

In another example, as goods (automated pallets 120) are received into the grid 130 for the first time, the system control server 160 recognizes the entry of the new pallets 120 into the grid 130 and captures and downloads the inventory data stored on the automated pallet's internal processor 740 (as shown in FIG. 7). The information captured by the internal processor 740 (as shown in FIG. 7) is communicated to the system control server 160 via the local area network (LAN) or alternatively via radio frequency (RF) wireless communication. The system control server 160 updates the inventory tables in the database 180, to make the goods available to the inventory manager 210 during order processing and fulfillment of future requests. Likewise, on the back-end, as an automated pallet 120 is loaded for delivery or otherwise emptied or removed, the system control server 160 updates the inventory management system accordingly in order to alert the inventory manager 210 of the change in inventory status.

Although the preferred embodiment utilizes hard wired technology to enable communications between the system control server 160 and the pallets 120, one ordinarily skilled in the art can appreciate that other techniques may be used including, but not limited to, wireless RF connections, infrared, Bluetooth™ and the like.

In addition to the automated updating features as described above, at any time, the data in the database 180 can be manually adjusted by trained operators using the operator node 140 to intervene, override automated processes, adjust schedules, enter ad hoc requests, correct errors, troubleshoot problems, or suspend or shut-down the system 100 either partially or entirely.

Because of the asynchronous nature of the three control system components, the system control server 160, the system manager 150 and the inventory manager 210, each can be managed and maintained separately from the others. Independent operation of these three components 160, 150, 210 enables containment of failure. Controlled delays or shutdowns of one component thereby do not affect or interfere with the operations of the other components.

As indicated herein, the system control server 160 is a collection of processes and logic that monitor, direct and coordinate the movement of automated pallets 120 throughout the grid 130. Specifically, and as shown in FIG. 3, the system control server 160 is divided into two sub-components: a control engine 310 and control director 320.

Figure 3:
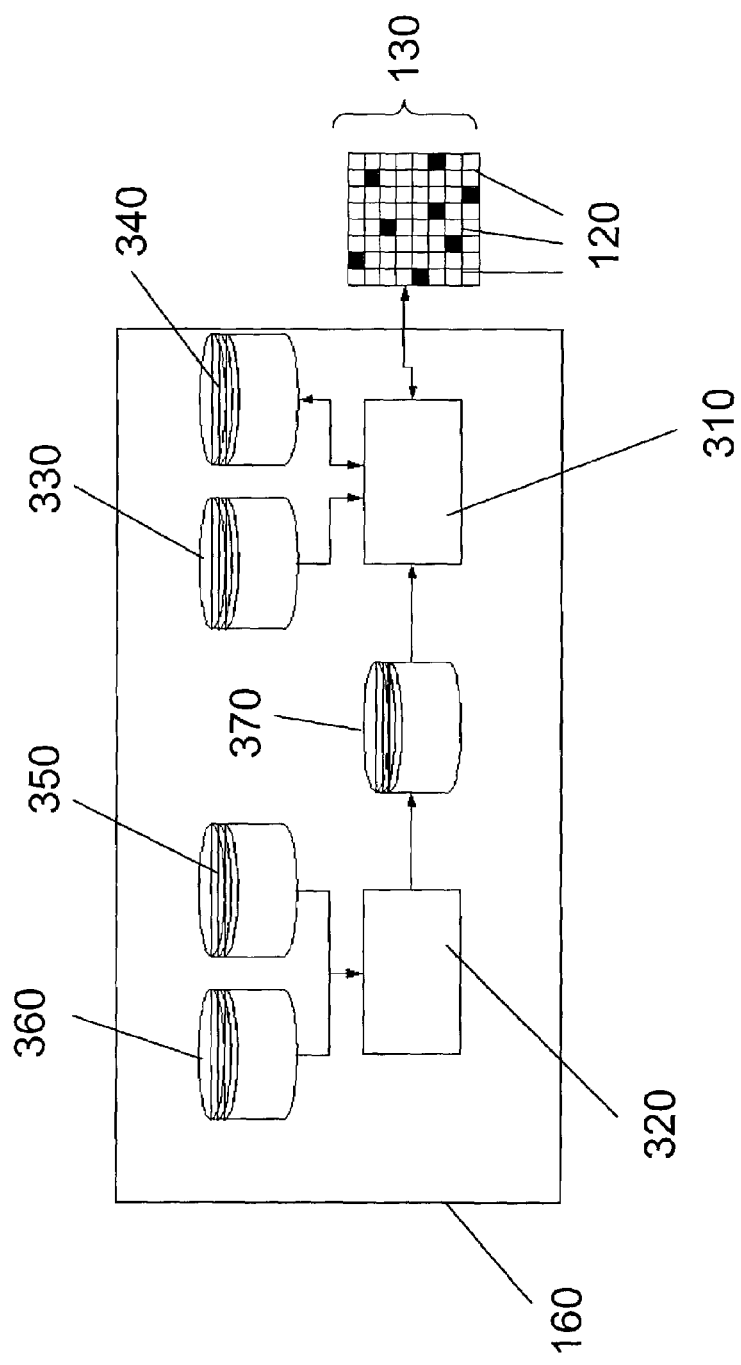
FIG. 3 illustrates an exemplary system flow diagram that suitably practices an embodiment of the invention.

FIG. 3 illustrates the interactions between the control engine 310 and the control director 320.

Specifically, the control director 320 monitors and/or integrates with order processing systems 360 and inventory management systems 350 and subsequently manages the fulfillment process responsive to a request. Additionally, the control director 320 manages, prioritizes and coordinates the flow of automated pallets 120 throughout the grid 130 while maintaining a work queue 370 which prompts the control engine 310 to calculate move sequences and sends movement commands to the pallets 120 in the configuration. Finally, the control director 320 updates inventory tables 350 stored in the database 180 as requests are processed and new automated pallets 120 arrive or are introduced into the grid 130.

Upon receiving request information via the work queue 370, the control engine 310 calculates a path for each automated pallet 120 in the grid 130 and sends movement instructions to the individual pallets 120 responsive to a request. Additionally, the control engine 120 is responsible for updating the environment 330 and current state 340 tables in the database 180 to reflect the current location of each pallet 120 in the grid 130 by polling the pallets 120 at startup, manual reset and continually during ongoing operation.

Furthermore, the control engine 310 detects the introduction of new pallets 120 into the grid 130, establishes communications, and downloads the inventory data 350 stored on the pallet internal processor 740 (as shown in FIG. 7), making the information available to the control director 320.

Just as the three main components of the controlling software are asynchronous, so too are these sub-components of the system control server 160. Problems, maintenance or idle time in one sub-system does not necessarily affect the operation of the other.

In operation, the control engine 310 calculates, at every point in time, the most efficient process to relocate a pallet 120 to a specified target location and accordingly issues a sequence of instructions to the pallets 120 to prompt the reposition pursuant to a request. This asynchronous process constantly checks the work queue 370, which is automatically filled by the control director 320 and/or manually updated by an operator using an operator node 140. The control engine 310 then factors these new parameters into the ever-shifting state of the grid 130 in response to future requests. As a result, the pallets 120 in the grid 130 will travel to the target location in accordance with the instructions issued by the control engine 310.

The automated pallets 120 are capable of bearing heavy loads and providing the motive means for pushing themselves one pallet-length in either of two directions, preferably, north and west (as a relative reference), and pulling themselves one pallet-length in either of two directions, preferably, east and south. Similarly, using this same motive means, a pallet 120 is capable of pushing or pulling an adjacent pallet 120 in these same four directions. The operation of the motive means will be described in detail below. A pallet 120 as described according to the preferred embodiment of the current invention is capable of pushing or pulling itself one space in two directions, and is capable of being pushed or being pulled by another pallet in the remaining two directions. Although the preferred embodiment moves the pallets one pallet length in any direction, it is contemplated that the system described can be modified to move a pallet any desired distance.

Figure 4:
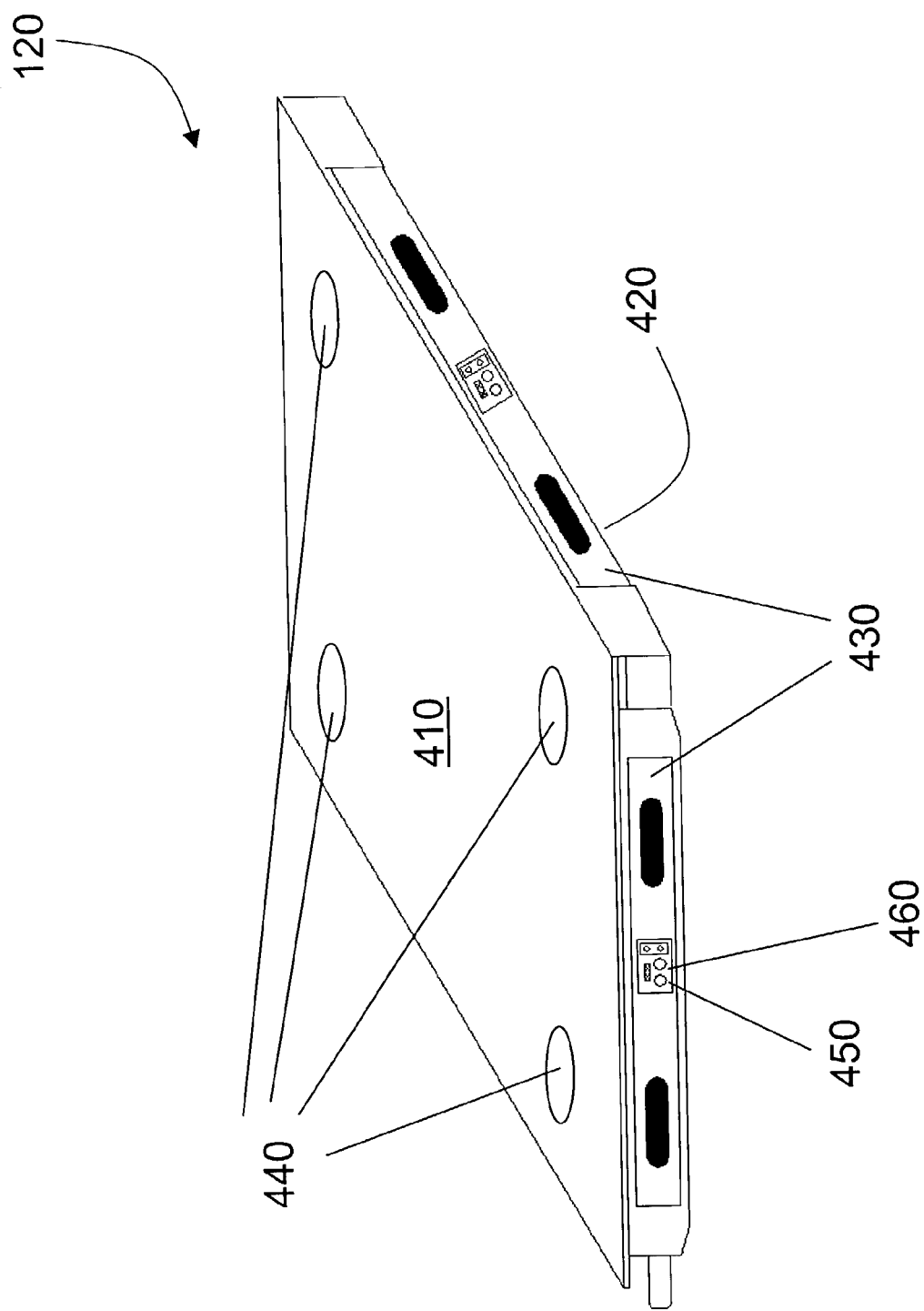
FIG. 4 illustrates a perspective view of a pallet that suitably practices an embodiment of the invention.

Illustrated in FIG. 4 is a perspective view of a pallet 120 in accordance with a preferred embodiment of the present invention. As shown, the pallet 120 is preferably rectangular in shape having a top surface 410, a bottom surface 420, and four sidewalls 430. The pallet 120 is preferably constructed of plastic. Although the pallet 120 in the preferred embodiment is constructed of steel, an artisan can appreciate that the pallet 120 may be constructed of other rigid material including but, not limited to aluminum, metal, alloy, steel, fiberglass, wood and the like.

The top surface 410 is capable of supporting a load and is equipped with load supporting fasteners 440 to be optionally used to secure a load onto the top surface 410. Preferably, the fasteners 440 are eye-hooks as shown, however, it is contemplated that alternate methods may be utilized to secure the load to the pallet 120 including but, not limited to straps, bands, notches, channels and the like.

The bottom surface 420 is equipped with an air cushion system 710 to facilitate low friction or frictionless movement of the pallet along a smooth surface. Alternatively, the air cushion system 710 can be replaced with wheels, rollers, casters, skids and the like.

The pallet 120 is equipped with utility junctions 450 on each sidewall. Specifically, the pallet 120 is equipped with male receptacles 470 on the north and west sidewalls and female receptacles 460 on the south and east sidewalls. This arrangement of male and female receptacles 460 enables two adjacent pallets 120 to be in electrical and pneumatic communication with one another. For example, when side by side, the male receptacle 470 on the west sidewall of one pallet 120 is entered into the female receptacle 460 on the east sidewall of the other pallet 120 causing the pallets 120 to establish optional electrical, communications and pneumatic connections with each other.

Figure 6A:
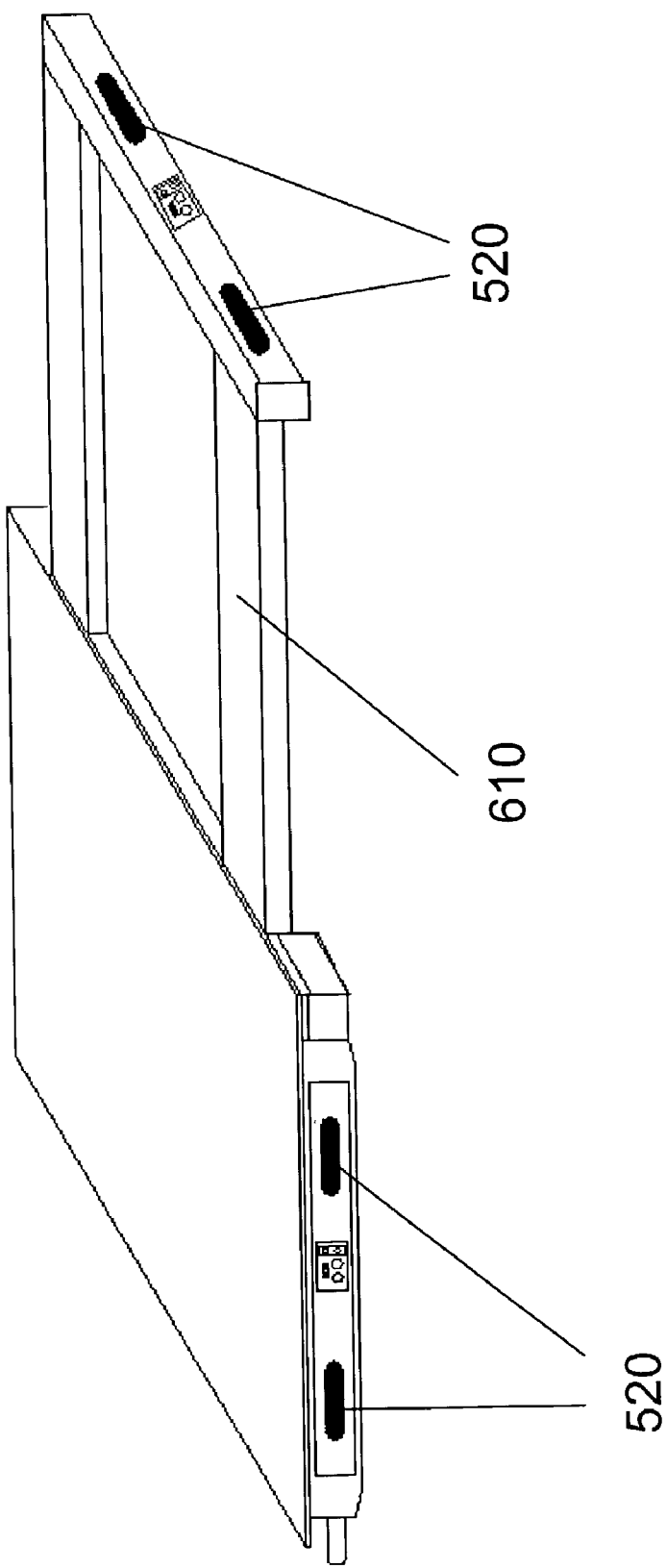
FIG. 6A illustrates a perspective view of a pallet and extended slide arm assembly that suitably practices an embodiment of the invention.
Figure 6B:
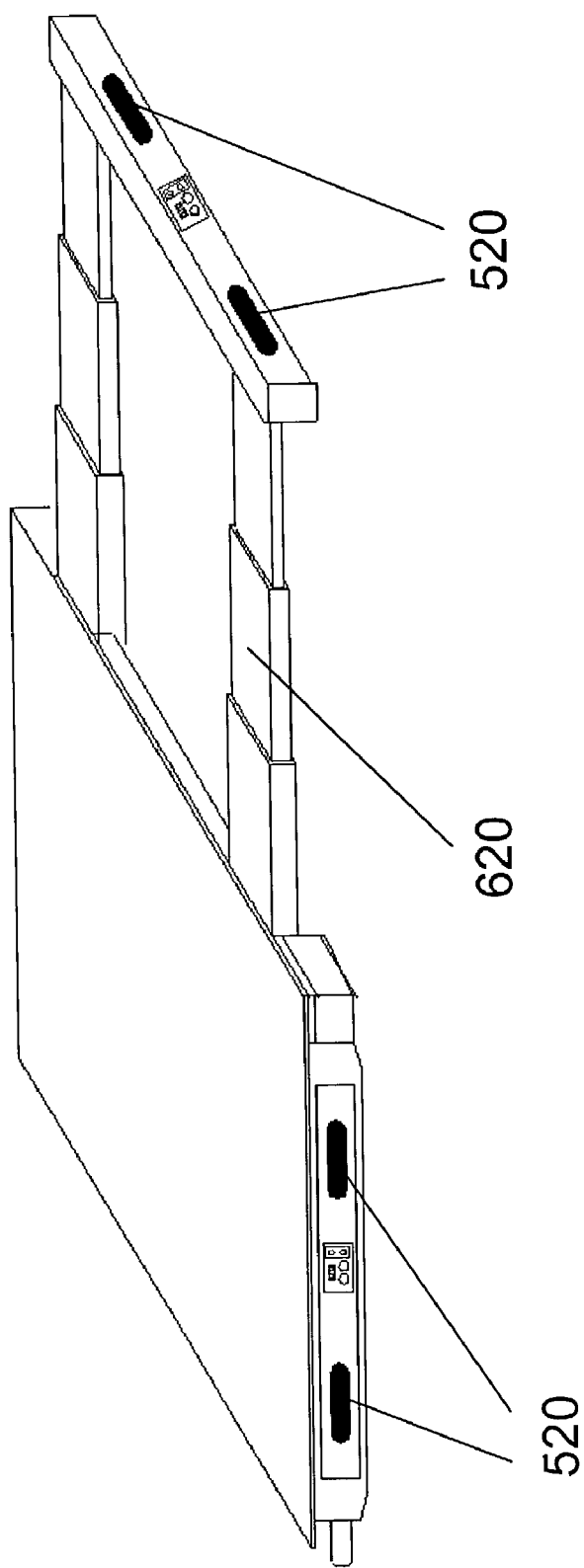
FIG. 6B illustrates a perspective view of a pallet and extended telescopic arm assembly that suitably practices an embodiment of the invention.

FIG. 5 illustrates a scissor arm assembly 510 comprising the utility junction 450 with female receptacle 460 extending from the east sidewall of a pallet 120. A variety of alternate embodiments of the arm assembly 510 are provided. As illustrated in FIGS. 5, 6A and 6B, a scissor-type arm assembly 510, a slide-type arm assembly 610 and a telescoping-type arm assembly 620, respectively, are contemplated. Additionally, a "hinged" arm mechanism (not shown) folded into the pallet that may swing out from a side of the pallet, allowing the pallet to be pushed or pulled. The preferred embodiment utilizes electric motors (not shown) to extend and retract the arm assemblies 510, 610, 620. Although the preferred embodiment of the present invention utilizes electric motors (not shown) to drive the actuator (not shown) controlling the extension and retraction of the arm assembly 510, 610, 620, alternate means of propulsion may be utilized including, but not limited to pneumatic cylinders, gears, pulleys, belts, lead screw propulsion methods, hydraulics, electro-magnetic, electro-mechanical, springs and the like.

In the preferred embodiment, the north and west faces of each pallet contain locking pins 730 (as shown in FIG. 7) by which the arm assemblies 510, 610, 620 couple and lock into the locking pin ports 520 positioned on the arm assemblies 510, 610, 620 that constitute the south and east sidewall of the pallet. Thus, when a plurality of pallets 120 are arranged and oriented accordingly, they create a patchwork of interconnecting pallets 120. In addition, when locking pins 730 (as shown in FIG. 7) are engaged, the arm assemblies 510, through the utility junctions 450 provide the coupling means to pass optional electricity, compressed air and computer communications from one pallet 120 to another via receptacles 460. The preferred embodiment utilizes on-board electric motors (not shown) to drive the extension and retraction of the arm assemblies 510, 610,620.

In alternative embodiments of the invention, the pallets 120 may utilize individual facilities such as on-board hydraulic systems, air blowers, batteries, wireless network communications and other mechanisms capable of providing services needed for the operation of the pallets 120.

Alternatively, a common bus system to pass power, computer communications and/or compressed air throughout the grid may be provided. In this embodiment, perimeter docking ports (PDP) (not shown) are positioned at multiple locations around the perimeter of the available pallet locations (see FIG. 9, discussed later). Two embodiments of the PDP are employed, consistent with and identical to the utility junctions 450 discussed previously. Relative to the constant orientation of all pallets 120 in a configuration, and corresponding to the utility junctions 450 on the pallets 120, PDP's positioned on the north and west perimeter are of the type comprising the female receptacles 460, and PDP's positioned on the south and east perimeters are of the type comprising male receptacles 470.

In embodiments of the entire system where PDP's are utilized, the PDP's are mounted on interior walls or mounted to fixed structures constituting barriers fastened to the floor. In each case, the PDP's are mounted at the level that facilitates the mating with utility junctions 450 on pallets 120, and each PDP is connected to the network (shown in FIG. 1) via the optional means defined previously and discussed later.

In another embodiment of the entire system that employs wireless networking technology in each pallet 120, PDP's are not used.

FIG. 7 illustrates a cross-section of the automated pallet 120 and its sub-assemblies.

As illustrated in FIG. 7, the preferred embodiment of the current invention employs the application of an air cushion system 710 to provide a thin film of air on which the load-bearing pallet 120 floats. This air cushion system 710 allows a pallet 120 carrying tons of material to easily move from one position to the next with minimal force required. All types of air cushion systems currently commercially available may be applied to the current invention.

Continued reference to FIG. 7 shows that an onboard canister pump 720 is provided to supply air to the air cushion system 710 embedded in the bottom surface 420 of the pallet 120. In yet other embodiments, an artisan can appreciate that the pallets 120 may be equipped with wheels, rollers and the like in place of air cushion system 710 without changing the scope or operation of the invention.

In the preferred embodiment of the present invention, each automated pallet 120 is provided with a computer processor, hardware and software control box 740 to enable the pallet 120 to receive instructions, store data and execute commands. Additionally, as previously described, each individual pallet 120 is capable of sending information to and receiving instructions from the system control server 160 and other pallets 120.

Preferably, the current invention employs common computer networking technology, TCP/IP, to facilitate messaging between the system control server 160 and the pallets 120 in the grid 130. Common routing software is provided to enable the automated pallets 120 in a configuration to communicate on a network. Each pallet 120 is uniquely identified and is able to distinguish between instructions being sent to itself and instructions intended for other pallets 120 in the grid 130. Because the system 100 is designed to identify the order of pallets 120 at any given time, messages sent by the system control server 160 are automatically forwarded from pallet 120 to pallet 120 until they reach the intended target pallet 120. As pallets 120 are constantly being moved, this routing information is constantly updated by the system control server 160 and subsequently stored in the database 180. Although the preferred embodiment utilizes a relational database 180 to store data, one ordinarily skilled in the art can appreciate that storing, retrieving and maintaining information can be accomplished using other means including, but not limited to, Random Access Memory (RAM), flat file structures, and the like.

Although the preferred embodiment utilizes a hard-wired TCP/IP communications protocol to facilitate communication between the pallets 120 to each other and to the system control server 160, an artisan can appreciate that other communication protocols may be utilized to accomplish communication including but, not limited to Ethernet™, X10, Wireless RF, Wireless Infrared, Bluetooth™,DeviceNet™ ModBus™ ModBus Plus™ and the like.

One skilled in the art will contemplate additional components that may be employed to further extend the functionality and capability of the pallets 120, including, but not limited to, a global positioning satellite (GPS) receiver and transmitter allowing a pallet's 120 exact position on the globe to be tracked, load cells or scales to automatically determine the weight of a pallet 120, tilt, level and acceleration sensors to monitor load stability, as well as radio frequency identification (RFID), Bar Code readers, ID Matrix readers, or vision systems.

Figure 8:
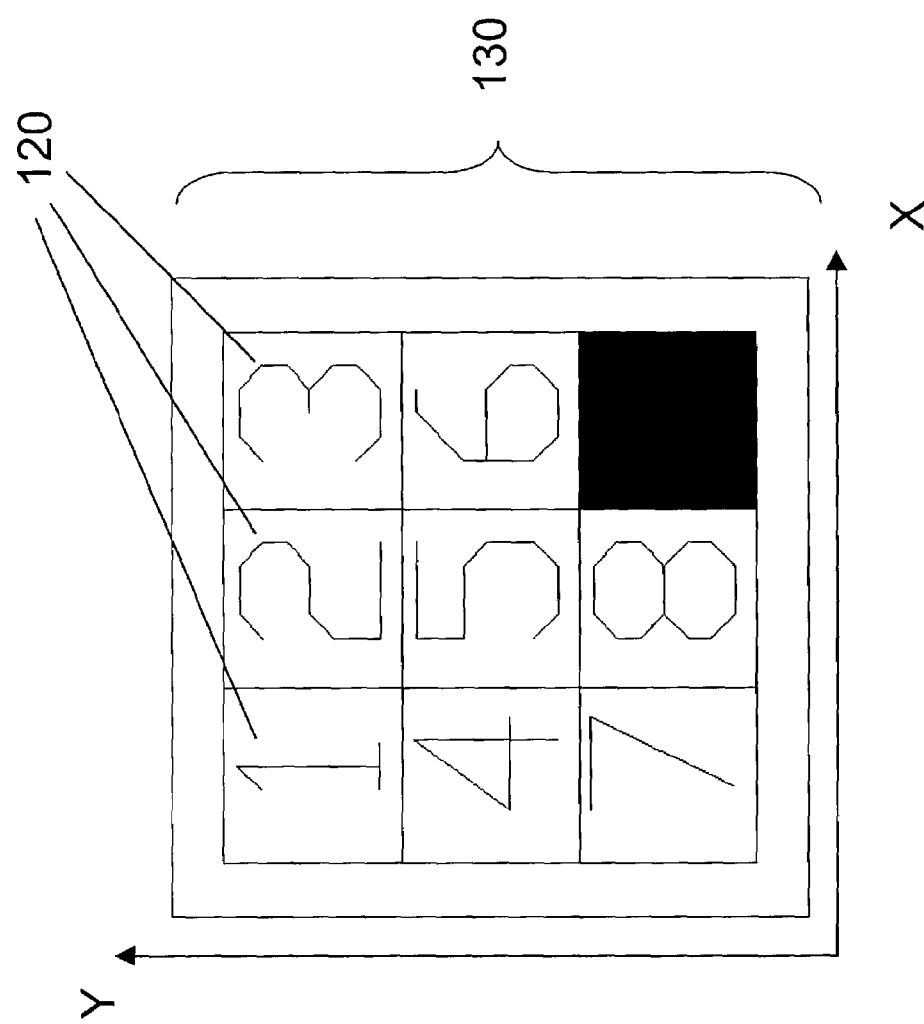
FIG. 8 illustrates an exemplary configuration diagram that suitably practices an embodiment of the invention.

In operation, the diagram in FIG. 8 illustrates the basic concept of transposition employed by one embodiment of the current invention. In this FIG. 8, the squares numbered 1 through 8 represent load-bearing pallets 120. The dark square represents an empty space. Given this configuration, either pallet 6 or pallet 8 could be moved into the empty space, leaving the space previously occupied empty. For example, if pallet 8 slides into the empty space to the right, the space it previously occupied will be left empty, allowing pallet 7 to slide one space to the right or pallet 5 to slide one space down. If pallet 5 slides down, then either pallet 2, 4 or 6 can slide into the space previously occupied by pallet 5. In this manner, any pallet 120 in the configuration can be relocated to any position on the grid 130 by simply displacing the empty space in a coordinated fashion.

In alternate embodiments of the current invention, many more pallets 120 and empty spaces are arranged contiguously in a grid 130. As previously discussed, as long as at least one empty space exists, any pallet 120 can be relocated to any other position through this method of transposition.

Figure 9:
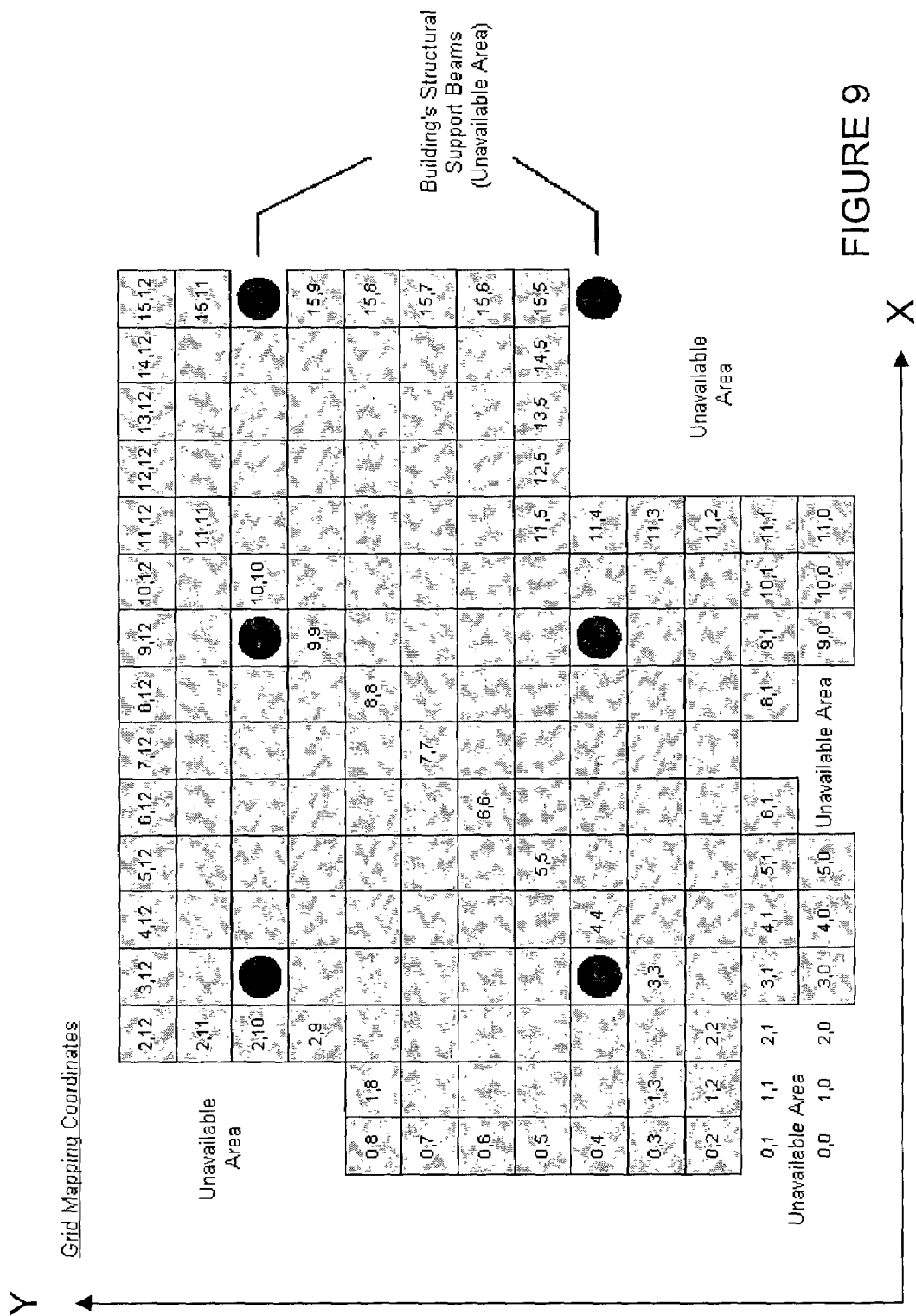
FIG. 9 illustrates a grid layout in accordance with an embodiment of the invention.

According to an embodiment of the present invention, FIG. 9 illustrates available floor space in a warehouse divided into a virtual grid 130 with storage spaces delineated by X,Y coordinates as shown.

As illustrated in FIG. 9, the grid configuration and X,Y coordinates depicted in FIG. 9 are purely virtual in nature and do not constitute any special demarcation or apparatus on the actual warehouse floor. The X,Y coordinates do however represent the organizational structure employed by the system 100 of an embodiment of the current invention. The specific controlling methods, logic and processes are described below.

Figure 10:
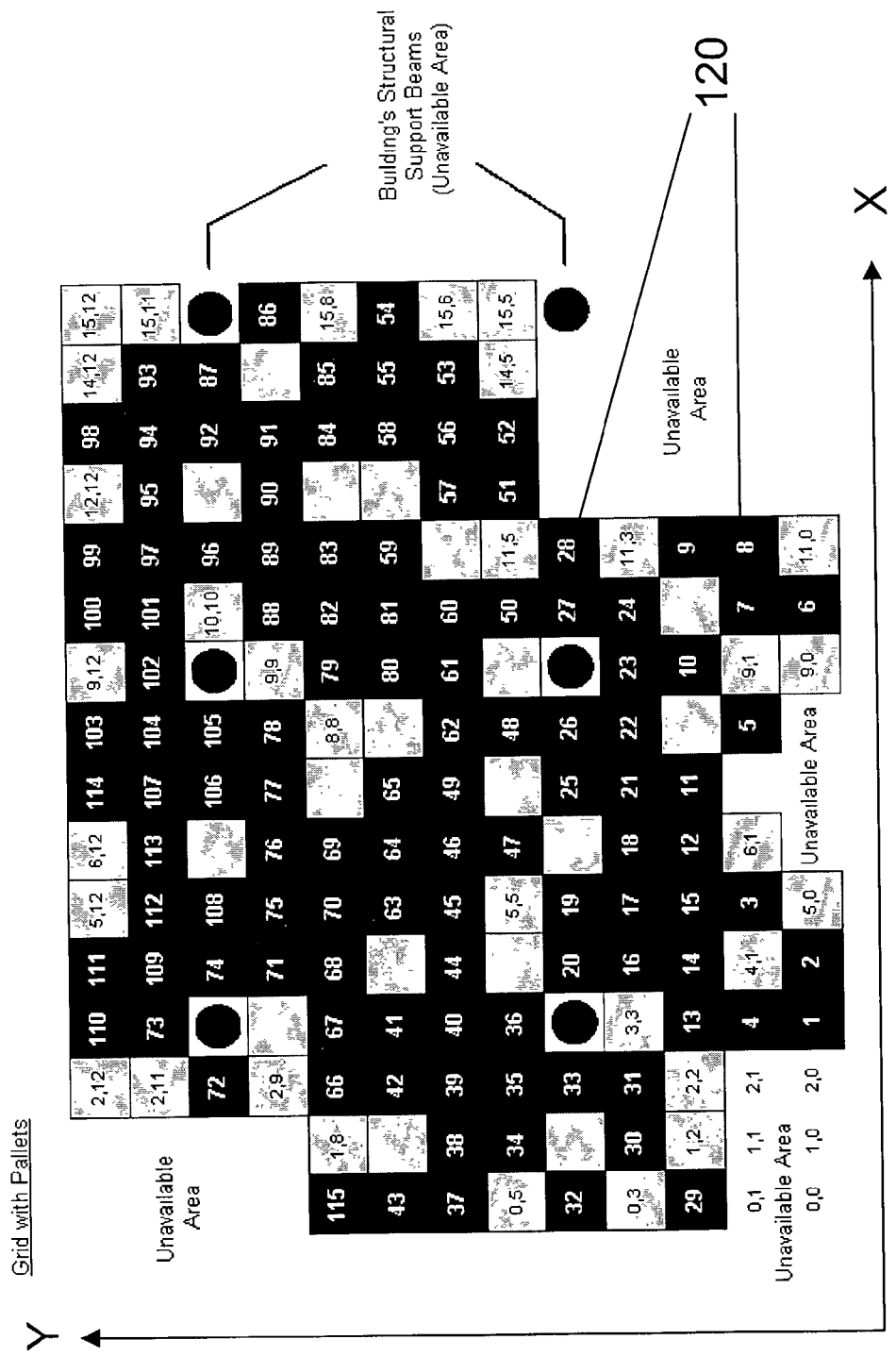
FIG. 10 illustrates a pallet layout in accordance with an embodiment of the invention.

For illustration, FIG. 10 shows the same warehouse floor as depicted in FIG. 9 superimposed with pallets 120 occupying most of the available storage positions. Accordingly, any pallet 120 in the FIG. 10 configuration can be relocated to any other available space by the transposition means previously described in FIG. 8.

The number of unoccupied spaces in any configuration is not required to exceed one. However, an artisan can appreciate that in each installation a balance is struck between the desire to maximize available space utilization and the need to relocate pallets quickly. If the need to maximize space utilization is greater than the requirement to move pallets quickly, then fewer unoccupied spaces are maintained. If the latter requirement is greater, then more spaces are left unoccupied.

In operation, and as previously discussed, the operator programs the system 100 with the coordinates of the layout of the floor and available spaces. A graphical user interface (GUI) (not shown) is provided to facilitate the construction and maintenance of the virtual floor layout. Likewise, a similar GUI is provided (not shown) to facilitate the construction and maintenance of the virtual representation of all pallets 120 and their locations in the configuration.

The table below represents the basic data structures utilized by the preferred embodiment of the system control server to track and manage the ever-shifting state of the entire system.

| Table/Column Name | Type | Prime Index | 2nd Index | Description |
|---|---|---|---|---|
| GRID_TABLE | Table | | | Contains one row for every available space |
| X | Integer | 1 | | "X" coordinate of the given space |
| Y | Integer | 2 | | "Y" coordinate of the given space |
| ENABLED | Boolean | | | YES/NO switch |
| PALLET_TABLE | Table | | | Contains one row for every Automated pallet |
| PALLET_ID | Integer | 1 | | Unique identifier |
| X | Integer | | 1 | Current "X" coordinate of the given pallet |
| Y | Integer | | 2 | Current "Y" coordinate of the given pallet |
| DEST_X | Integer | | | Destination "X" coordinate of the given pallet |
| DEST_Y | Integer | | | Destination "Y" coordinate of the given pallet |
| POWER_STATUS | Integer | | | Power supply status indicator |
| COMM_STATUS | Integer | | | Electronic communications status indicator |
| AIR_STATUS | Integer | | | Air supply status indicator |
| UP_ARM_STATUS | Integer | | | Upper arm assembly status indicator |
| RT_ARM_STATUS | Integer | | | Right arm assembly status indicator |
| ENABLED | Boolean | | | YES/NO switch |

Initially, the pallet table (shown above) is populated by optional automatic or manual means. As described herein, the preferred method employs both means. A collection of pallets 120 numbering not less than 8 are placed and positioned contiguously on the designated available floor space with at least one pallet 120 connected to the network via one of the many perimeter docking ports discussed earlier. Upon start-up or optional manual reset, the control engine 310 polls all perimeter docking ports to detect the presence of the (at least one) connected pallets 120. Because every perimeter docking port is associated with a fixed physical location, a row can be inserted into the pallet table (shown above) comprising the pallet ID and values representing the X,Y coordinates for the location. Additionally, one skilled in the art will recognize that the control engine 310, through the perimeter docking ports and the previously identified pallet(s) 120 connected to the perimeter docking ports can identify and calculate the X,Y coordinates for adjacent pallet(s) 120. This process is repeated through all subsequent adjacent pallets 120 until all pallets 120 have been identified and a row has been inserted into the pallet table (shown above) for each pallet 120 in the configuration.

Upon gathering the necessary data as shown above for each pallet 120 in the configuration, the control engine 310 communicates with the database server 170 to store the data in the database 180.

The floor layout as shown in FIG. 9 is converted by the operator into a set of X-Y coordinates. These coordinates are entered into the grid table as shown above. The grid table above is a static collection of data representing the layout of the floor populated during configuration of the entire system and, therefore, is updated only when the collection of available pallet locations is altered. The data in this grid table changes only when the actual layout of the existing floor space changes. As in a standard grid arrangement, the grid table contains a row that corresponds to every square space of floor available to a pallet. As floor space is never perfectly symmetrical or entirely usable, one skilled in the art will recognize that unavailable spaces are designated by the absence of a row for the given unavailable coordinates.

The available floor space as illustrated in FIG. 9 is mapped out on an X,Y axis. In this example, coordinates 0,0 are assigned to the bottom-left-most corner for any configuration, however, because the coordinates are relative, the 0,0 coordinate can be assigned to any location on the floor. As is the case in the example of FIG. 9, location 0,0 is not always an available space. In accordance with FIG. 9, the grid table in the database would contain the following rows and values:

| X | Y | ENABLED |
|---|---|---|
| 0 | 2 | Y |
| 0 | 3 | Y |
| 0 | 4 | Y |
| 0 | 5 | Y |
| 0 | 6 | Y |
| 0 | 7 | Y |
| 0 | 8 | Y |
| 1 | 2 | Y |
| 1 | 3 | Y |
| 1 | 4 | Y |
| 1 | 5 | Y |
| 1 | 6 | Y |
| 1 | 8 | Y |
| 2 | 2 | Y |
| 2 | 3 | Y |
| 2 | 4 | Y |
| ... | ... | ... |

As seen in the grid table above, there is no entry in the table for the space corresponding to the coordinates 0,0-0, 1-1,0-1,1-2,1 and 2,1. The absence of rows with these values indicates to the control engine 310 that those spaces are not available for population by a pallet 120.

Additionally, by using the operator node, the operator is able to designate a space temporarily unavailable. The "Enabled" column is used by system operators to designate a particular grid space as temporarily unavailable. An entry in the grid table with ENABLED="N" is treated the same as a non-existent row for those coordinates.

Unlike the grid table, the pallet table (shown above) is very much a dynamic table. The values in this pallet table constantly change to affect and reflect the existence, location and movement of automated pallets 120 throughout the grid 130. The control engine 310 constantly selects data from the pallet table, calculates movement instructions, issues commands to the individual automated pallets 120, then updates the values in this table at the conclusion of successful movements. This cycle repeats continuously until the system is halted, shut down or the work queue becomes empty.

FIG. 10 is an illustration of pallets superimposed on the grid as identified in FIG. 9. Accordingly, the pallet table identifies the current location of every pallet in the grid. Below is a pallet table corresponding to the location of the pallets as illustrated in FIG. 10.

| PALLET ID | X | Y |
|---|---|---|
| 1 | 3 | 0 |
| 2 | 4 | 0 |
| 3 | 5 | 1 |
| 4 | 3 | 1 |
| 5 | 8 | 1 |
| 6 | 10 | 0 |
| 7 | 10 | 1 |
| 8 | 11 | 1 |
| 9 | 11 | 2 |
| 10 | 9 | 2 |
| 11 | 7 | 2 |
| 12 | 6 | 2 |
| 13 | 3 | 2 |
| 14 | 4 | 2 |
| 15 | 5 | 2 |
| 16 | 4 | 3 |
| ... | ... | ... |

Every automated pallet 120 is assigned a unique pallet identifier that is embedded into the pallet's internal processor (not shown) disposed in the control box 740. This unique pallet ID, represented here as a list a contiguous integers starting with 1, are captured by the control engine 310 at startup or reset time and used as the primary key values when populating the pallet table. In practice, the values in the pallet ID field may be "16-digit" hexadecimal values, however, integers are used in this example for the ease of discussion.

The most fundamental of all of the processes and logic that make up the control engine 310 is the pallet mover logic. This logic is called upon continuously to calculate pallet 120 movements in accordance with requests in the work queue 370. The logic uses the values in the grid and pallet tables to determine which pallet 120 needs to move in response to a request. Therefore, one call to the pallet mover logic will result in at least one pallet 120 being moved one space in some direction. Additional pallets 120 are moved each time the pallet mover logic is invoked. Each time the logic is invoked the control engine 310 reassesses the current state of the configuration by referring to the current pallet table and subsequently issues instructions to effectuate the most logical move given the entire arrangement of the grid 130 at that particular time.

For example, again referring to layouts shown in FIGS. 9 and 10, suppose a request is entered to move pallet ID 115 (at X,Y coordinates 0,8) from the left side of the floor to location 15,8 which is on the right side of the floor. Upon assessing the current state of the configuration, the control engine 310 determines that pallet 115 must move laterally to the right by subtracting the origin X,Y coordinates (0,8) from the destination coordinates (15,8). The positive X value from the result (15,0) indicates an east (relative) direction. A negative value for X would indicate the pallet needs to move west. Likewise, a positive value in the Y coordinate result would indicate the pallet must move north, while a negative value indicates south. In this example, the Y value of zero means the pallet is currently on the correct lateral row relative to the target location.

Continuing with the example, the logic then determines if pallet ID 115 is able to move one space east, by determining if the adjacent space to the east is an available space, and if so, if that available space is vacant. In reaching this determination, the pallet mover logic must first determine the location of pallet ID 115. In doing so, the values for X and Y are selected from the pallet table where the pallet ID=115. With these coordinates, a query is made by the control engine 310 to the grid table to determine if the location one space to the right of pallet ID 115 (X+1,Y) is an available space in the grid 130. This determination is accomplished by selecting a column or aggregate value from the grid table where X=the value of X+1 for pallet ID 115 and Y=the value of Y for pallet ID 115 and ENABLED=YES. If a row value is returned from the query, the space is available. Otherwise the space is not available, and the control engine 310 will calculate a movement in another direction before it will be able to move it to the right.

In this example, the space at location 1,8 (one space to the right) is an available space, therefore the logic must next check to see if the space is occupied. It checks for occupancy of a particular space by querying the pallet table where X=(in this case, 1) and Y=(in this case, 8). In this example, no row is found that contains these values, therefore, the control engine 310 has determined that the available space to the east is vacant.

Now, for any configuration oriented in the way previously discussed there are 2 ways a pallet 120 can move in an eastward direction. Because the motive means, that being the arm assemblies 510, 610, 620, for each pallet 120 are oriented on the south and east sidewalls 430 of the pallet 120, a pallet 120 can be pushed to the east by an adjacent pallet 120 to the west, or it can extend the arm assembly 510, 610, 620 from the east sidewall 430 across a vacant space and latch onto another pallet 120 or perimeter docking port and then retract the same arm assembly 510, 610, 620 effectively pulling itself one space to the east. Therefore, the logic next looks for a pallet 120 one space to the left to be pushed by. This is done by issuing a query to the pallet table, where X=(in this case, X−1) and Y=(in this case, 8). Now, no row is returned which indicates to the control engine 310 that there is no pallet 120 available to push pallet number 115 to the east.

Next, the logic checks location 2,8 which is two spaces to the right for a pallet 120 which would enable pallet ID115 to utilize its east facing arm assembly 510, 610 to pull itself to the east. Upon querying the pallet table where X=2 and Y=8, a row value is returned indicating to the control engine 310 that pallet ID 66 is located in that position. Accordingly, the control engine 310 issues the instructions to pallet ID 115 to extend its right arm assembly 510, 610, 620, attach to pallet ID 66, turn on its air cushion, retract its arm assembly 510, 610, 620 (causing it to pull itself one space to the east), then turn off the air. Finally, the control engine 310 updates the pallet table setting X=1 and Y=8 where pallet ID=115 completing the cycle.

The control engine 310 continually cycles through this logic until the requested move is complete. Continuing with our example, the logic determines that the location one space to the right of pallet ID 115 (which is now 2,8) is available but, not empty. This situation dictates that the control engine 310 must either move pallet ID 66 out of the way, or move pallet ID 115 in another direction. Because the requested destination for pallet ID 115 is on the same Y coordinate, the control engine 310 will make every effort to not move pallet ID 115 off the current Y axis.

Accordingly, pallet ID 66 now becomes the designated pallet 120 to be moved. The control engine 310, already knowing that pallet ID 66 is positioned at location 2,8, checks to see if the location one space north of pallet ID 66 is available. A query to the grid table where X=2 and Y=9 returns a row value indicating to the control engine 310 that the space is available. The pallet table is then queried for a row value with the same coordinates to verify that a pallet 120 is not present in the space. Because there is no pallet 120 in the space, the control engine 310 determines that it can move pallet ID 66 north one space, provided there is a pallet 120 to push against or to be pulled towards. The same logic as identified above is used to make the determination. Instructions are issued by the control engine 310 and communicated to the pallet 120 that cause the pallet 120 to move. Finally, the pallet table is updated accordingly.

With pallet ID 66 now moved, another loop through the logic of the control engine 310 is concluded. The next invocation of the process will follow the same path as the first, since there is an empty available space to the east of pallet ID 115. This cycle repeats itself continuously until pallet ID 115 has been moved to its designated location.

One skilled in the art will anticipate how this fundamental logic is organized, adjusted, and reapplied to facilitate movement calculations in all four directions (relatively, north, south, east and west).

While it has been demonstrated pallet movements are calculated and coordinated fundamentally one at a time, in the preferred embodiment it is contemplated, and one skilled in the art will recognize, that multiple movements will occur simultaneously throughout a configuration. Furthermore, in the preferred embodiment, complex and compound move sequences are contemplated involving "strings" of pallets 120 contiguously arranged on a common X or Y coordinate. Examples include, but are not limited to, a string of pallets 120 moving in unison, and a string of pallets 120 moving in alternate sequences starting with the first pallet 120 in the string, followed by the second, then followed by the first and third simultaneously, then the second and forth simultaneously, then the first, third and fifth simultaneously, and so on.

In accordance with the specific configuration of the floor, and particularly corresponding to the number of vacant spaces on the floor, the amount of shifting of pallets 120 can be minimized or maximized to meet desired performance levels to balance the need for speed with the utilization of available space. In any case, the logic used to achieve the reposition of the pallets 120 is as described above.

Figure 11:
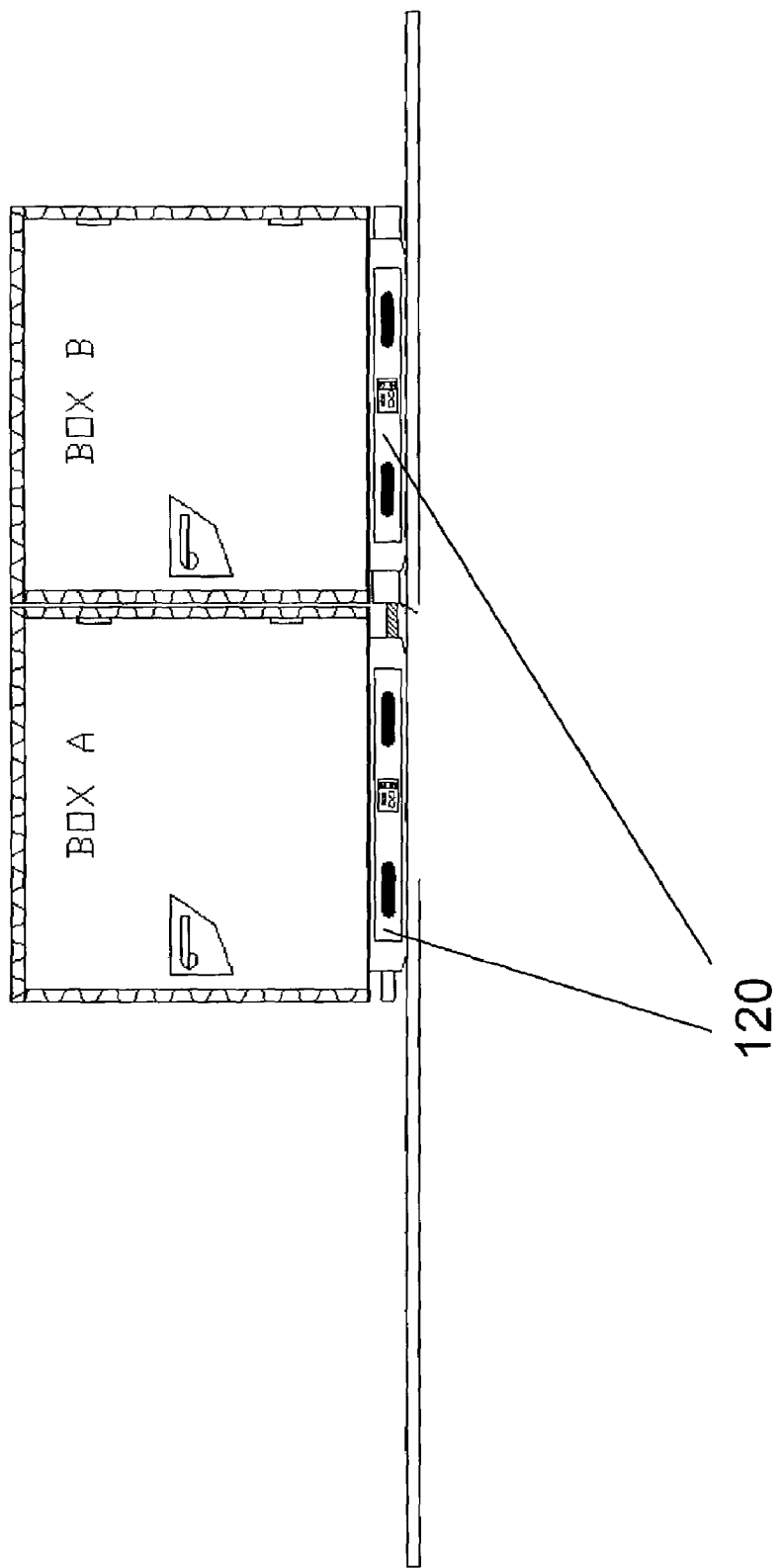
FIG. 11 illustrates a side view of two adjacent pallets coupled together in accordance with an embodiment of the invention.
Figure 12:
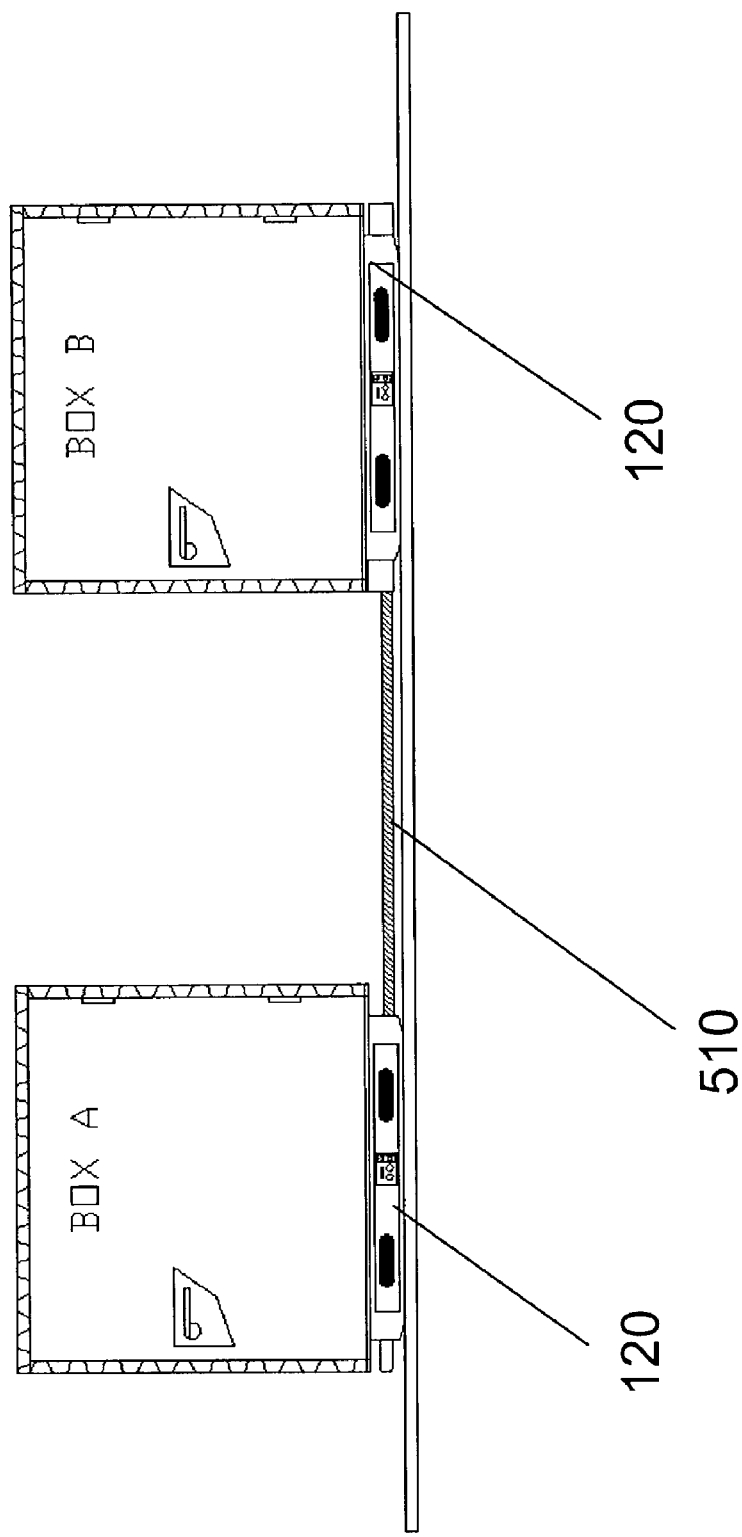
FIG. 12 illustrates a side view of two pallets coupled together using an extended arm assembly.

In operation, following a determination of the available grid spaces by the above-described logic, moving instructions are sent to the pallets 120 by the control engine 310 to effectuate the move. FIG. 11 illustrates two pallets 120 carrying cargo boxes (Boxes A and B) attached via the arm assemblies 510,610 of one pallet 120 and the locking pins 730 of the other. As shown, the pallet 120 carrying Box A has its arm assembly 510,610 partially extended and is mechanically locked to the pallet 120 carrying Box B. FIG. 12 further illustrates the pushing and pulling action. To effectuate a move, the pallet 120 carrying Box A would turn on its air cushion system, extend the arm assembly 510,610, and push itself one pallet-length away. The pallet 120 carrying Box B stays in place because its air cushion is deactivated causing the pallet 120 to act as a push-stop for the pallet 120 carrying Box A.

The pallet 120 carrying Box A then turns off its air cushion and either disconnects from the other pallet and retracts its arm assembly 510 leaving an unoccupied space between them. Alternatively, the pallet 120 carrying Box B can turn on its air cushion and the pallet 120 carrying Box A can retract its arm assembly 510,610 pulling the pallet 120 carrying Box B next to it leaving an empty space to the right of the pallet 120 carrying Box B.

Figure 13:
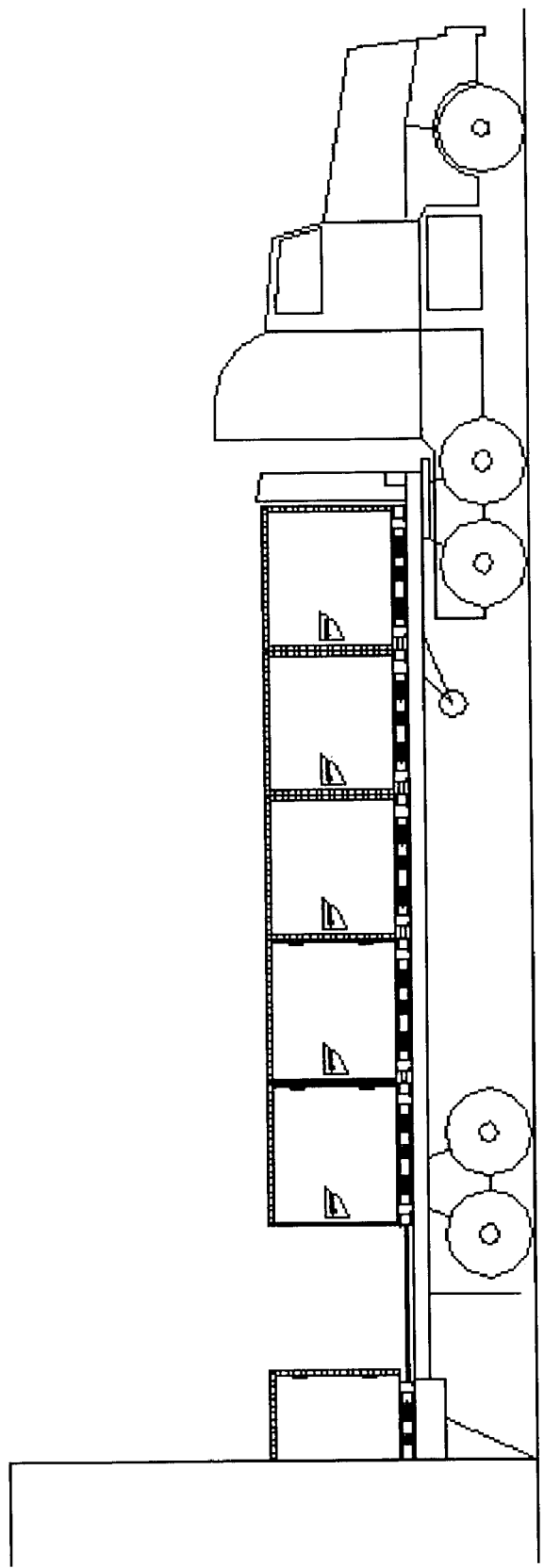
FIG. 13 illustrates a side view of a conveyor application that suitably practices an embodiment of the invention.
Figure 14:
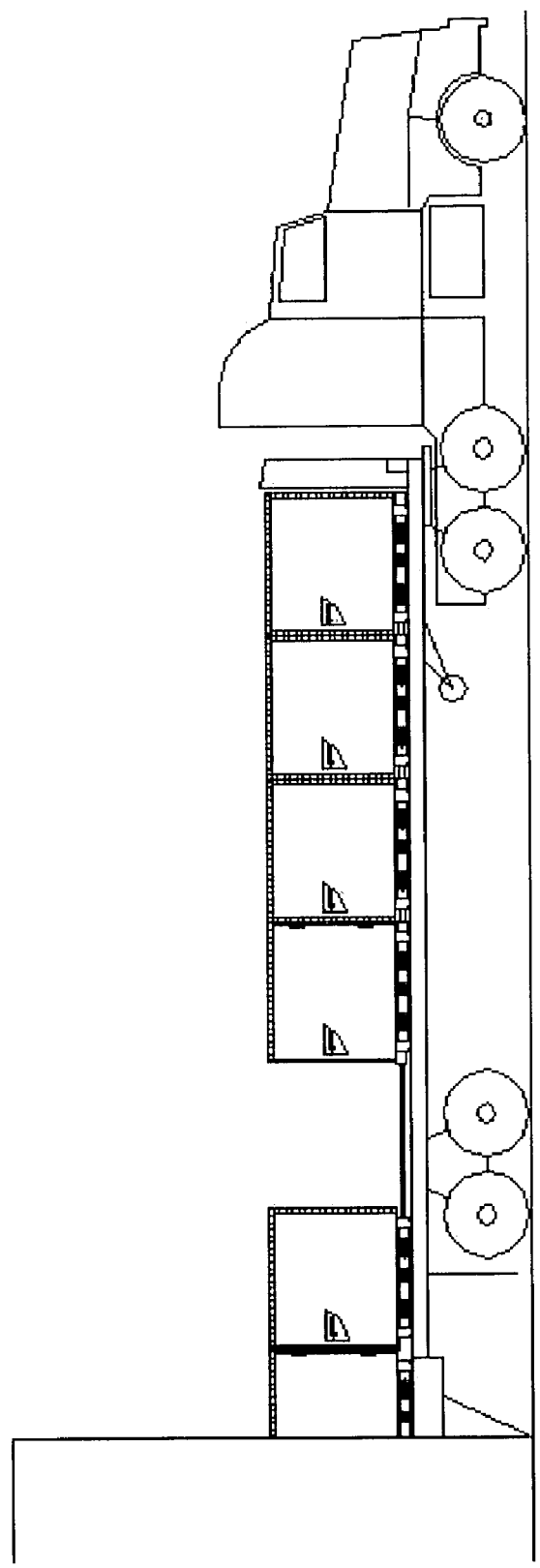
FIG. 14 illustrates a side view of a conveyor application that suitably practices an embodiment of the invention.

In addition to the grid 130 configuration discussed previously, it is contemplated that a minimum of two such automated pallets 120 can be utilized together in an alternating in-line fashion to push and pull each other causing each to be propelled down a straight line creating a virtual conveyor. It is contemplated that this in-line fashion can be used to automate the loading and unloading of cargo from transport vehicles as illustrated in FIGS. 13 and 14. As illustrated in FIG. 13, the push-pull technique described above may be utilized to create a virtual conveyor.

Figure 15:
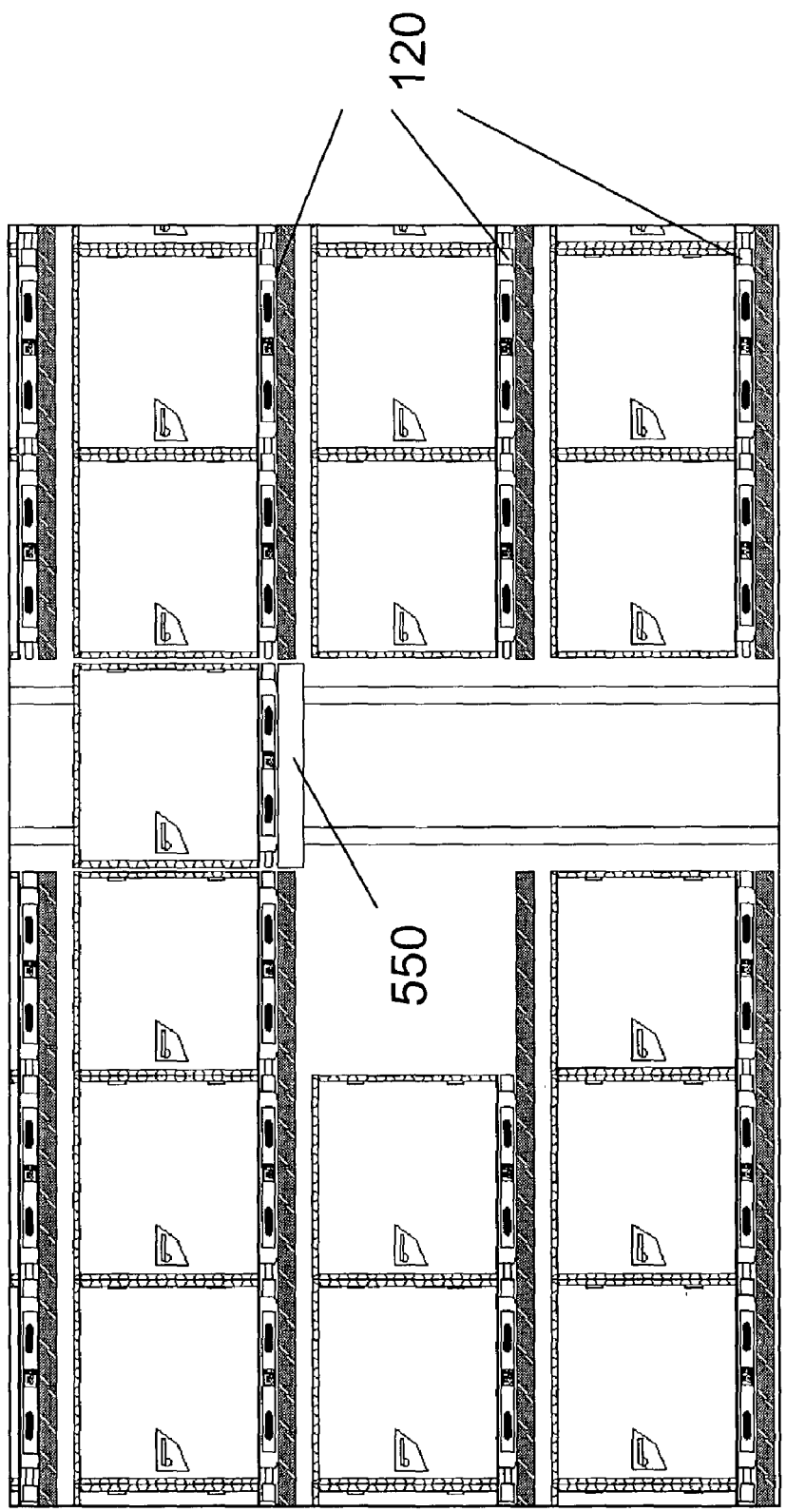
FIG. 15 illustrates a side view of a multiple level application that suitably practices an embodiment of the invention.
Figure 16:
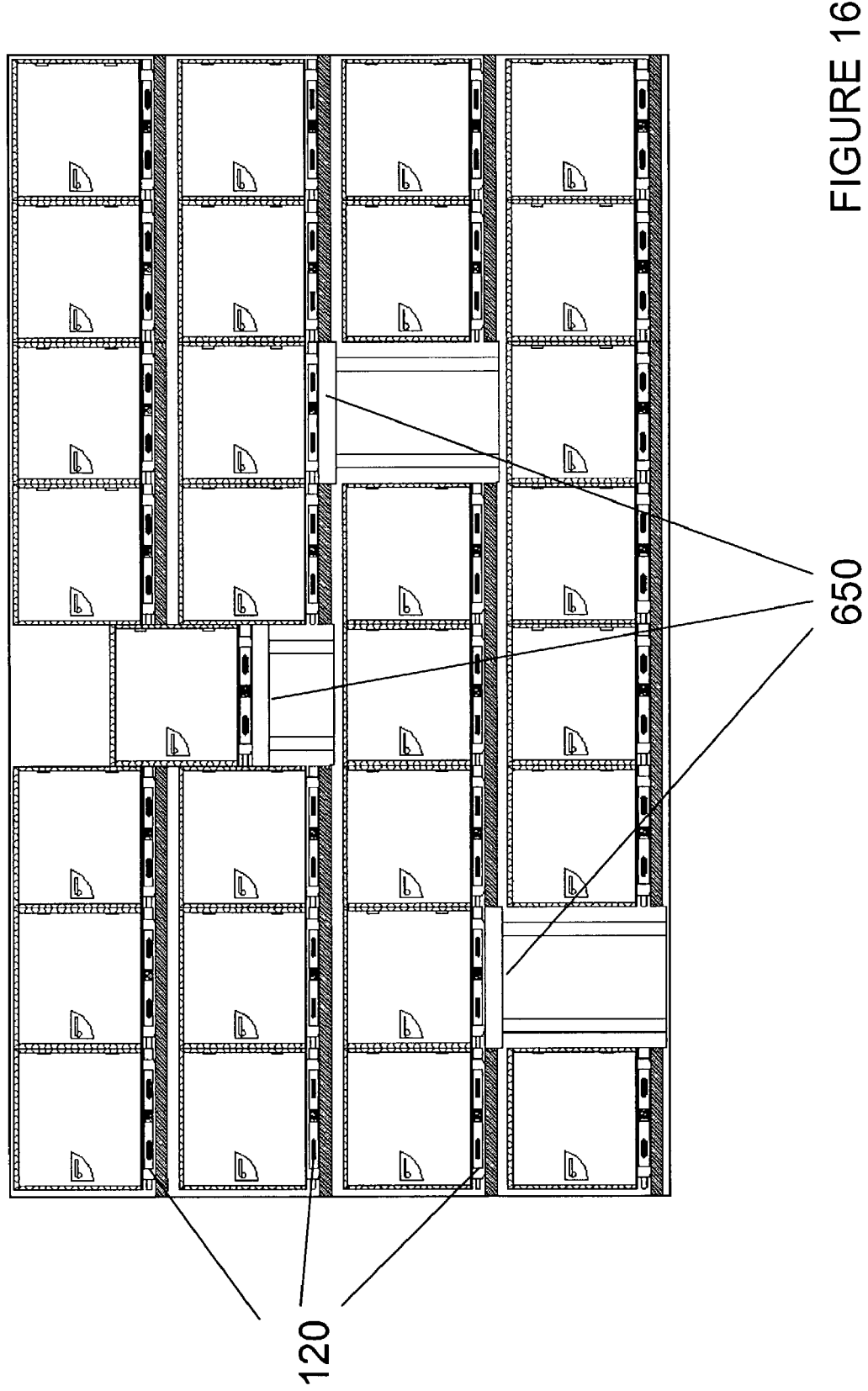
FIG. 16 illustrates a side view of a multiple level application that suitably practices an embodiment of the invention.

As the apparatus and method have now been described as deployed on a single floor, deck or other surface, an alternate design is contemplated for use in multiple level applications. The current invention provides for the means to transfer pallets and respective loads to between floors by the use of a variety of elevator and/or lift mechanisms. FIGS. 15 and 16 illustrate varying embodiments of lifting means for use in multiple level applications. One skilled in the art will recognize the a variety of currently available industrial lift and hoist systems can be employed to affect movement of pallets 120 between floors or levels. One skilled in the art will also appreciate that the fundamental configuration on the 2-dimensional plane can easily be repeated and applied to support a complete system comprising multiple levels.

FIG. 15 illustrates an embodiment of the system that utilizes a central elevator 550 to move pallets 120 between levels. In this embodiment, responsive to a request to move a pallet 120 from one level to another, the system positions the pallet onto the elevator 550. The elevator 550 would then travel either up or down in accordance with the target location, and upon arrival at the appropriate level, the pallet 120 may pull itself or be pulled by another pallet 120 in the same fashion as previously discussed.

Alternatively, FIG. 16 illustrates an embodiment that utilizes a lifter assembly 650 that can move a single pallet 120 up or down one level. As shown in FIG. 16, multiple lifter assemblies 650 may be positioned at many locations throughout the configuration allowing pallets 120 to move freely between levels by positioning the pallet 120 over the lifter assembly 650 location and moving up or down one level.

There have been described and illustrated herein embodiments of the apparatus and method of using the same to automate storage, retrieval and transportation of goods while maximizing efficiencies and likewise optimizing physical space. While particular embodiments of the invention have been described, it is not intended that the invention be limited thereto. It is intended that the invention be as broad in scope as the art will allow and that the specification be read likewise. For example, those skilled in the art will appreciate that certain features of one embodiment may be combined with features of another embodiment to provide yet additional embodiments. It will therefore be appreciated by those skilled in the art that other modifications could be made to the provided invention without deviating from its spirit and scope as so claimed and described.

We claim:

1. A moveable pallet comprising:

a pallet; and an arm assembly connected to said pallet, said arm assembly capable of engaging an other pallet for inducing relative movement between said pallet and said other pallet.

2. The pallet as set forth in claim 1 further comprising low friction movement means disposed on said pallet to assist in movement of said pallet.

3. The pallet as set forth in claim 2 wherein said low friction movement means is an air pallet assembly.

4. The pallet as set forth in claim 1 further comprising a transmitter for sending locational data.

5. The pallet as set forth in claim 1 further comprising a receiver for receiving a movement instruction from a control engine.

6. The pallet as set forth in claim 1 wherein said arm assembly is a scissor-type arm assembly.

7. The pallet as set forth in claim 1 wherein said arm assembly is a telescopic-type arm assembly.

8. A pallet comprising:
  a surface for supporting a load;
  at least one arm assembly means disposed beneath said surface; and
  means for actuating said at least one arm assembly to induce relative movement between said pallet and an other pallet.

9. The pallet as set forth in claim 8 further comprising at least one latching mechanism disposed on said pallet.

10. The pallet as set forth in claim 8 wherein said actuating means is an electric motor.

11. The pallet as set forth in claim 8 further comprising a transmitter for sending locational data relative to said pallet.

12. The pallet as set forth in claim 8 further comprising a receiver for receiving a movement instruction from a control engine.

13. The pallet as set forth in claim 8 wherein said arm assembly is a scissor-type arm assembly.

14. The pallet as set forth in claim 8 wherein said arm assembly is a telescopic-type arm assembly.

15. A method for moving a pallet, said method comprising the steps of:
  identifying available and unavailable locations in a grid;
  creating a grid table representative of grid coordinate data relative to said available and unavailable locations in said grid;
  identifying pallet occupied and unoccupied locations in said grid;
  creating a pallet table representative of pallet coordinate data relative to said occupied and unoccupied locations in said grid;
  comparing said grid table to said pallet table;
  determining a movement instruction;
  communicating said movement instruction to said pallet to induce movement relative to an other pallet;
  actuating an arm assembly on said pallet to engage an other pallet; and
  inducing relative movement between said pallet and said other pallet.

* * * * *